United States Patent
Rice

(10) Patent No.: US 9,286,274 B2
(45) Date of Patent: Mar. 15, 2016

(54) ADAPTIVE CONTENT MANAGEMENT

(71) Applicant: Moboom Ltd., Subiaco (AU)

(72) Inventor: Jeffrey David Rice, Belvedere Tiburon, CA (US)

(73) Assignee: MOBOOM LTD., Subiaco (AU)

( * ) Notice: Subject to any disclaimer, the term of this patent is extended or adjusted under 35 U.S.C. 154(b) by 0 days.

(21) Appl. No.: 14/606,567

(22) Filed: Jan. 27, 2015

(65) Prior Publication Data

US 2015/0212989 A1    Jul. 30, 2015

Related U.S. Application Data

(60) Provisional application No. 61/932,646, filed on Jan. 28, 2014.

(51) Int. Cl.
| | |
|---|---|
| *G06F 3/0482* | (2013.01) |
| *G06F 3/0484* | (2013.01) |
| *G06F 17/24* | (2006.01) |
| *G06F 17/22* | (2006.01) |
| *G06F 17/30* | (2006.01) |
| *G06F 17/21* | (2006.01) |

(52) U.S. Cl.
CPC .......... *G06F 17/2247* (2013.01); *G06F 17/212* (2013.01); *G06F 17/24* (2013.01); *G06F 17/30896* (2013.01)

(58) Field of Classification Search
CPC ... G06F 17/3089; G06F 17/24; G06F 3/0482; G06F 3/0484
See application file for complete search history.

(56) References Cited

U.S. PATENT DOCUMENTS

| | | | | |
|---|---|---|---|---|
| 6,724,403 | B1 * | 4/2004 | Santoro | G09G 5/14 715/765 |
| 6,779,153 | B1 | 8/2004 | Kagle | |
| 7,546,543 | B2 * | 6/2009 | Louch | G06F 8/38 715/762 |
| 8,595,186 | B1 * | 11/2013 | Mandyam | G06F 8/38 707/632 |
| 2002/0032701 | A1 | 3/2002 | Gao et al. | |
| 2002/0049603 | A1 | 4/2002 | Mehra et al. | |
| 2002/0120598 | A1 | 8/2002 | Shadmon et al. | |

(Continued)

FOREIGN PATENT DOCUMENTS

| | | |
|---|---|---|
| KR | 10-1130397 B1 | 3/2012 |
| WO | WO 02-21749 A2 | 3/2002 |

OTHER PUBLICATIONS

Photosnack.com, Jun. 25, 2011 (hereinafter: Photosnack), pp. 1-2 http://www.photosnack.com/photo-slideshow-maker/.*

(Continued)

*Primary Examiner* — Scott Baderman
*Assistant Examiner* — Mario M Velez-Lopez
(74) *Attorney, Agent, or Firm* — Knobbe, Martens, Olson & Bear LLP

(57) ABSTRACT

Methods and systems for enabling a user to define a webpage and webpage layout without knowing a programming language are disclosed. A library of modules is provided usable to configure a layout and look of a webpage. The user may add modules from the library to a webpage layout design area. The user may configure a given module so as to control the look and feel of the content accessed and displayed by the module. Different instantiations of the same module may be used to access content from different sources, including sources using different file and data formats. Content from the different sources may be accessed and stored in a schema-less database.

28 Claims, 25 Drawing Sheets

(56) References Cited

U.S. PATENT DOCUMENTS

| | | | |
|---|---|---|---|
| 2002/0156812 A1* | 10/2002 | Krasnoiarov | G06F 17/30867 715/234 |
| 2002/0174126 A1 | 11/2002 | Britton et al. | |
| 2002/0188862 A1* | 12/2002 | Trethewey | H04L 63/083 726/4 |
| 2003/0012286 A1* | 1/2003 | Ishtiaq | H04N 19/895 375/240.27 |
| 2004/0006563 A1 | 1/2004 | Zwiegincew et al. | |
| 2004/0073552 A1* | 4/2004 | Bailey | G06F 9/45516 |
| 2006/0074981 A1 | 4/2006 | Mauceri, Jr. et al. | |
| 2006/0195819 A1* | 8/2006 | Chory | G06F 17/3089 717/117 |
| 2006/0277460 A1* | 12/2006 | Forstall | G06F 17/30905 715/234 |
| 2006/0277481 A1* | 12/2006 | Forstall | G06F 17/30899 715/764 |
| 2007/0038934 A1 | 2/2007 | Fellman | |
| 2007/0106952 A1* | 5/2007 | Matas | G06F 17/30905 715/764 |
| 2007/0136320 A1* | 6/2007 | Sah | G06Q 30/02 |
| 2007/0226612 A1 | 9/2007 | Sun | |
| 2007/0288858 A1* | 12/2007 | Pereira | G06F 9/4443 715/764 |
| 2008/0034441 A1* | 2/2008 | Saha | G06F 17/3089 726/27 |
| 2008/0133722 A1* | 6/2008 | Ramasundaram | H04L 67/02 709/222 |
| 2008/0201452 A1 | 8/2008 | Athas et al. | |
| 2008/0281898 A1* | 11/2008 | Pesce | G06F 17/30873 709/201 |
| 2008/0282171 A1* | 11/2008 | Katz | G06F 17/3089 715/735 |
| 2009/0007017 A1* | 1/2009 | Anzures | G06F 3/04883 715/835 |
| 2009/0064017 A1* | 3/2009 | Biniak | G06F 3/048 715/764 |
| 2009/0164883 A1* | 6/2009 | Decker | G06F 17/3089 715/234 |
| 2009/0248883 A1* | 10/2009 | Suryanarayana | G06F 9/4443 709/229 |
| 2009/0260022 A1* | 10/2009 | Louch | B60K 35/00 719/328 |
| 2009/0300483 A1 | 12/2009 | Viet | |
| 2010/0037145 A1* | 2/2010 | Sides | G06F 17/248 715/744 |
| 2010/0037168 A1* | 2/2010 | Thayne | G06F 17/24 715/769 |
| 2010/0169755 A1* | 7/2010 | Zafar | G06Q 10/00 715/205 |
| 2010/0211565 A1* | 8/2010 | Lotito | G06F 17/30864 707/723 |
| 2011/0022704 A1 | 1/2011 | Duan et al. | |
| 2011/0078582 A1 | 3/2011 | Christianson et al. | |
| 2011/0107227 A1* | 5/2011 | Rempell | G06F 9/4443 715/738 |
| 2011/0161803 A1 | 6/2011 | Yao et al. | |
| 2011/0167336 A1* | 7/2011 | Aitken | G06F 3/04883 715/239 |
| 2011/0214078 A1* | 9/2011 | Klask | G06F 8/38 715/763 |
| 2011/0252082 A1 | 10/2011 | Cobb et al. | |
| 2012/0117516 A1 | 5/2012 | Guinness | |
| 2012/0144416 A1* | 6/2012 | Wetzer | H04N 21/25816 725/14 |
| 2012/0210247 A1 | 8/2012 | Khouri et al. | |
| 2012/0290955 A1 | 11/2012 | Quine | |
| 2013/0055063 A1 | 2/2013 | Mondal et al. | |
| 2013/0055070 A1 | 2/2013 | Sacks et al. | |
| 2013/0080471 A1* | 3/2013 | Forte | G06F 21/6218 707/785 |
| 2013/0097488 A1 | 4/2013 | Coman et al. | |
| 2013/0191498 A1 | 7/2013 | Crockett et al. | |
| 2013/0219024 A1 | 8/2013 | Flack | |
| 2013/0227056 A1 | 8/2013 | Vecera et al. | |
| 2013/0275379 A1* | 10/2013 | Trebas | G06F 17/3012 707/644 |
| 2014/0089786 A1 | 3/2014 | Hashmi | |
| 2014/0258837 A1* | 9/2014 | Horton | G06F 17/212 715/234 |

OTHER PUBLICATIONS

Web Form Validation: Best Practices and Tutorials http://www.smashingmagazine.com/2009/07/07/web-form-validation-best-practices-and-tutorials/, Dec. 30, 2010 pp. 1-21.*

Mime Type Detection in Internet Explorer, Jan. 1, 2012 (hereinafter; MIME), pp. 1-8 http://msdn.microsoft.com/en-us/library/ms775147(v=VS.85).aspx.*

What is a Key/value store database?, Feb. 18, 2012 (hereinafter: stackexchange), pp. 1-6 http://dba.stackexchange.com/questions/607/what-is-a-key-value-store-database/619.*

Indexing Schemaless Documents in Mongo, Oct. 4, 2013, (hereinafter: Calvin), pp. 1-6 http://calv.info/indexing-schemaless-documents-in-mongo/.*

Adding Content to Your Site, Sep. 9, 2011, (hereinafter: NetworkSolutions), pp. 1-5 http://www.Networksolutions.com/support/adding-a-custom-widget-to-your-site/.*

Dashboard Widgets, Jun. 9, 2012 (hereinafter: Apple Dashboard), pp. 1-2 http://www.apple.com/downloads/dashboard/.*

U.S. Appl. No. 14/338,134, filed Jul. 22, 2014, Rice et al.

U.S. Appl. No. 14/543,383, filed Nov. 17, 2014, Rice et al.

International Search Report in PCT Application No. PCT/US2014/047889 dated Oct. 31, 2014.

Verkoijen, "Running Rails and PHP on the same website," published Oct. 10, 2013 by Voormedia.com, pp. 1-6.

International Search Report, mailed Feb. 25, 2015, International Application No. PCT/US2014/066203, Applicant: Moboom Ltd.; 3 pp.

Written Opinion of the International Searching Authority, mailed Feb. 25, 2015, International Application No. PCT/US2014/066203, Applicant: Moboom Ltd.; 10 pp.

PCT International Search Report Written Opinion of the International Searching Authority in International Application No. PCT/US2015/013094, dated May 19, 2015, 12 pages.

\* cited by examiner

Configure Content

Select Attributes

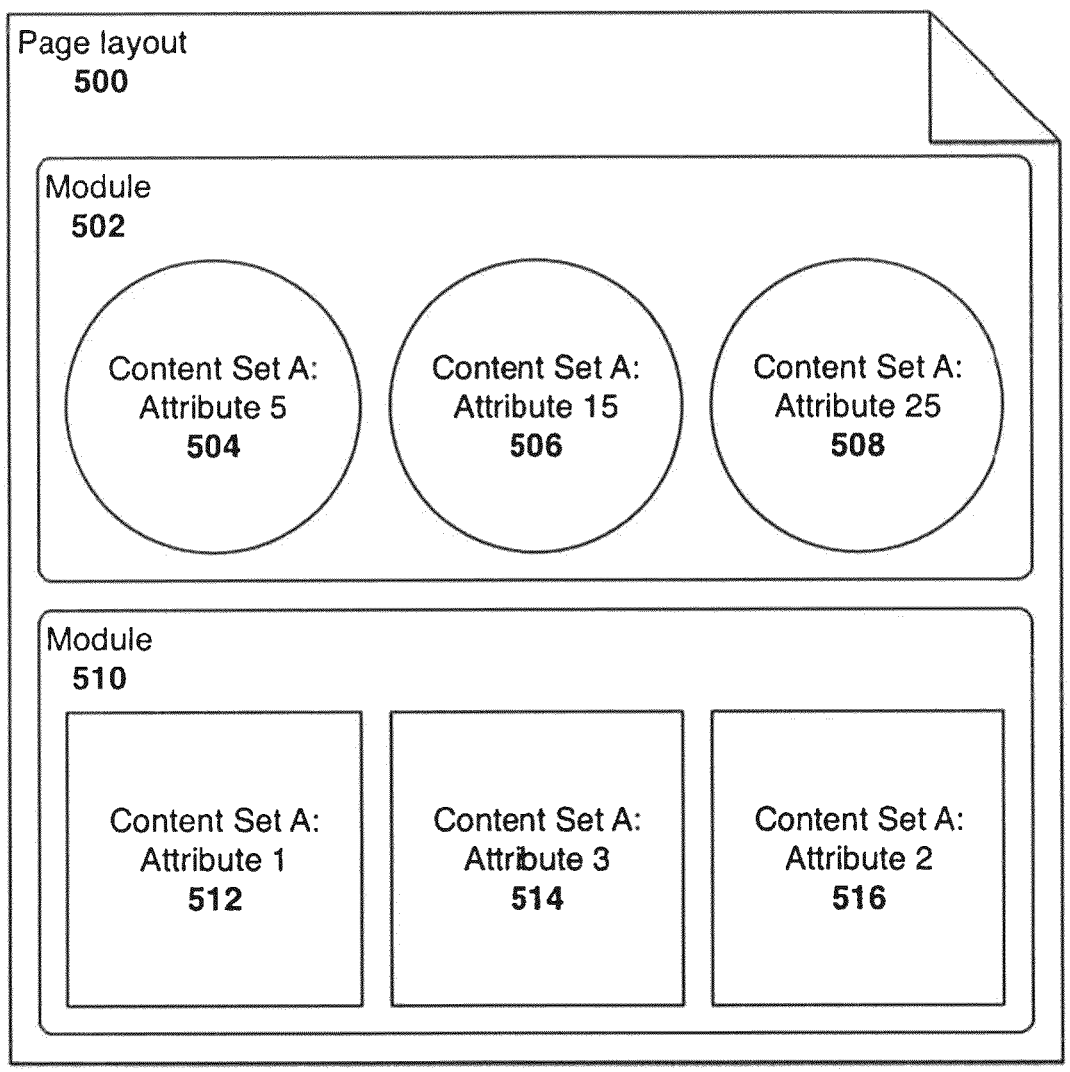
FIG. 5 Page Layout

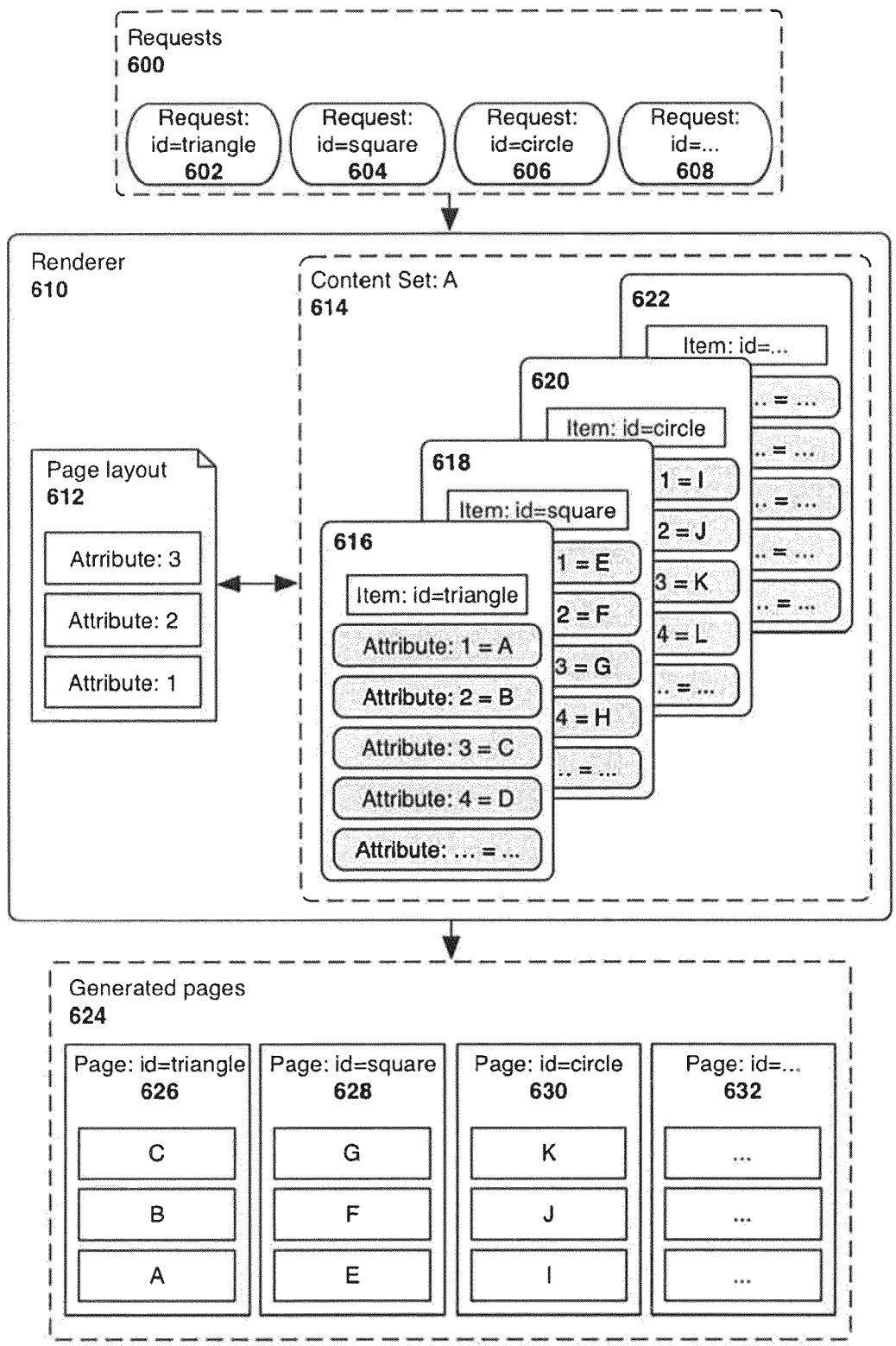

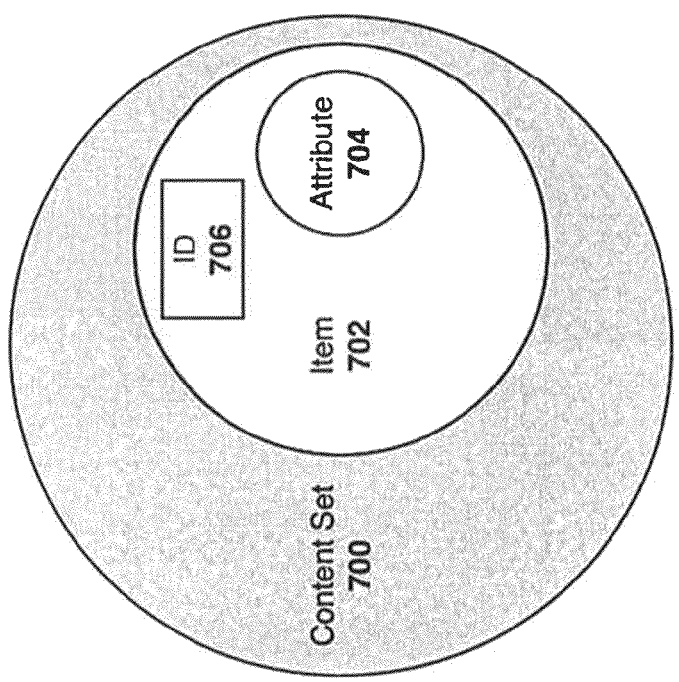
FIG. 7B  Unique ID
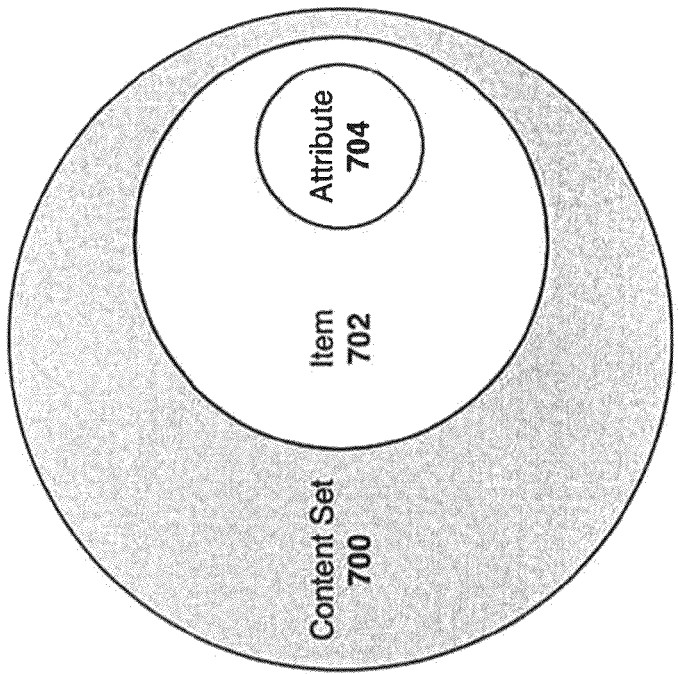
FIG. 7A  Content Sets, Items, and Attributes Content Set Information Content Set Information for XML Feeds Content Set Information for Password Protected Data Content Set Information for FTP Feeds Manual Mapping of Attributes for a Content Set

FIG. 13

Content Set Info

NAME *
[Products] — 1300

FILE FORMAT
1302 — [XML ▽]

LOCATION
[On the web ▽] — 1304

XML DOCUMENT ELEMENT *
(THE DOCUMENT ELEMENT THAT SURROUNDS EACH ITEM IN THE FILE)
[tea] — 1306

ID FIELD
(THE FIELD IN THE SOURCE DATA THAT CAN BE USED TO UNIQUELY IDENTIFY THE RECORDS)
[id] — 1308

URL *
[http://example.com/feeds/teas.xml] — 1310

USERNAME
[ ] — 1312

PASSWORD
[ ] — 1314

[Create] — 1316

ADAPTIVE CONTENT MANAGEMENT

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

BACKGROUND OF THE INVENTION

1. Field of the Invention

The field relates to content management, such as content management for electronic document content.

2. Description of the Related Art

A plugin is also known by other names, such as extension, widget, or module. Plugins are typically built to work with external data and may be configured to ingest content or display content on a webpage. Plugins may be used to extend the functionality of a content management system to enable functionality to be added to a user's website.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. It is understood that while various aspects are described, certain embodiments may include any combination of the described aspects, or subsets thereof.

An aspect of the disclosure includes methods and systems for enabling a user to define a webpage and webpage layout without knowing a programming language are disclosed. A library of modules may be provided that is usable to configure a layout and look of a webpage. The user may add modules from the library to a webpage layout design area (e.g., using a drag-and-drop or other technique). The user may configure a given module so as to control the look and feel of the content accessed and displayed by the module. Different instantiations of the same module may optionally be used to access content from different sources, including sources using different file and data formats. Content from the different sources may be accessed and stored in a schema-less database.

An aspect of the disclosure includes a computer-implemented method of configuring a web page layout, the method comprising: providing a user access to a library of modules usable to configure a layout of a webpage, wherein a given module from the library of modules is user configurable, without the user programming in a programming language, to control how content is to be displayed on a webpage; enabling the user to drag and drop one or more modules from the library of modules onto a webpage layout design area to define a webpage layout; providing, for a given module selected by the user, a module configuration user interface, wherein the module configuration user interface enables the user to specify what content is to be displayed on the webpage being designed and how the content is to be displayed without the user having to program using a programming language, wherein the module user interface comprises interfaces configured to receive at least: access information for content from a source, the access information including at least a content locator; content attributes comprising at least one attribute affecting how content from the source is displayed; receiving a user specified layout for a first webpage specified by the user via the webpage layout design area, wherein the user specified layout comprises a layout of a plurality of modules, including: a first instantiation of a first module configured by the user to specify access information and at least one attribute for a first content source that provides content using a first content format; a second instantiation of the first module configured by the user to specify access information and at least one attribute for a second content source that provides content using a second content format, the second content format different than the first content format; accessing content from the first content source based at least in part on the user configuration of the first instantiation of the first module, including at least a portion of the user specified access information for the first source, wherein the content from the first content source utilizes the first content format; storing content from the first content source in a schema-less data store; accessing content from the second content source based at least in part on the user configuration of the second instantiation of the first module, including at least a portion of the user specified access information for the second source, wherein the content from the second content source utilizes the second content format; storing content from the second content source in the schema-less data store; enabling the webpage to be rendered, including the content from the first content source and the content from the second content source.

An aspect of the disclosure includes a computer-implemented method of configuring a web page layout, the method comprising: providing a user access to a library of modules usable to configure a layout of a webpage, wherein a given module from the library of modules is user configurable, without the user programming in a programming language, to control how content is to be displayed on a webpage; enabling the user to instantiate one or more modules from the library of modules onto a webpage layout design area to define a webpage layout; providing, for a given module selected by the user, a module configuration user interface, wherein the module user interface comprises interfaces configured to receive at least: access information for content from a source, the access information including at least a content locator; receiving a user specified layout for a first webpage specified by the user via the webpage layout design area, wherein the user specified layout comprises a layout of a plurality of modules, including: a first instantiation of a first module configured by the user to specify access information and at least one attribute for a first content source that provides content using a first content format; a second instantiation of the first module configured by the user to specify access information and at least one attribute for a second content source that provides content using a second content format, the second content format different than the first content format; accessing content from the first content source based at least in part on the user configuration of the first instantiation of the first module, including at least a portion of the user specified access information for the first source, wherein the content from the first content source utilizes the first content format; optionally storing content from the first content source in a schema-less data store; accessing content from the second content source based at least in part on the user configuration of the second instantiation of the first module, including at least a portion of the user specified access information for the second source, wherein the content from the second content source utilizes the second content format; optionally storing content from the second content source in the schema-less data store; enabling the webpage to be rendered, including the content from the first content source and the content from the second content source.

An aspect of the disclosure includes a system, comprising: a network interface configured to communicate over a network; a computing system comprising one or more computing devices; a computer storage system comprising a non-transitory storage device, said computer storage system having stored thereon executable program instructions that direct the computer system to at least: provide, over the network, a user access to a library of modules usable to configure a layout of a webpage, wherein a given module from the library of modules is user configurable, without the user programming in a programming language, to control how content is to be displayed on a webpage; enable the user to instantiate one or more modules from the library of modules onto a webpage layout design area to define a webpage layout; provide, for a given module selected by the user, a module configuration user interface, wherein the module configuration user interface enables the user to specify what content is to be displayed on the webpage being designed and how the content is to be displayed without the user having to program using a programming language, wherein the module user interface comprises interfaces configured to receive at least: access information for content from a source, the access information including at least a content locator; content attributes comprising at least one attribute affecting how content from the source is displayed; receive, over the network, a user specified layout for a first webpage specified by the user via the webpage layout design area, wherein the user specified layout comprises a layout of a plurality of modules, including: a first instantiation of a first module configured by the user to specify access information and at least one attribute for a first content source that provides content using a first content format; a second instantiation of the first module configured by the user to specify access information and at least one attribute for a second content source that provides content using a second content format, the second content format different than the first content format; access content from the first content source based at least in part on the user configuration of the first instantiation of the first module, including at least a portion of the user specified access information for the first source, wherein the content from the first content source utilizes the first content format; store content from the first content source in a schema-less data store; access content from the second content source based at least in part on the user configuration of the second instantiation of the first module, including at least a portion of the user specified access information for the second source, wherein the content from the second content source utilizes the second content format; store content from the second content source in the schema-less data store; enable the webpage to be rendered, including the content from the first content source and the content from the second content source.

An aspect of the disclosure includes a computer storage system comprising a non-transitory storage device, said computer storage system having stored thereon executable program instructions that direct a computer system to at least: provide a user access to a library of modules usable to configure a layout of a webpage, wherein a given module from the library of modules is user configurable, without the user programming in a programming language, to control how content is to be displayed on a webpage; enable the user to instantiate one or more modules from the library of modules onto a webpage layout design area to define a webpage layout; provide, for a given module selected by the user, a module configuration user interface, wherein the module configuration user interface enables the user to specify what content is to be displayed on the webpage being designed and how the content is to be displayed without the user having to program using a programming language, wherein the module user interface comprises interfaces configured to receive at least: access information for content from a source, the access information including at least a content locator; content attributes comprising at least one attribute affecting how content from the source is displayed; receive a user specified layout for a first webpage specified by the user via the webpage layout design area, wherein the user specified layout comprises a layout of a plurality of modules, including: a first instantiation of a first module configured by the user to specify access information and at least one attribute for a first content source that provides content using a first content format; a second instantiation of the first module configured by the user to specify access information and at least one attribute for a second content source that provides content using a second content format, the second content format different than the first content format; access content from the first content source based at least in part on the user configuration of the first instantiation of the first module, including at least a portion of the user specified access information for the first source, wherein the content from the first content source utilizes the first content format; store content from the first content source in a schema-less data store; access content from the second content source based at least in part on the user configuration of the second instantiation of the first module, including at least a portion of the user specified access information for the second source, wherein the content from the second content source utilizes the second content format; store content from the second content source in the schema-less data store; enable the webpage to be rendered, including the content from the first content source and the content from the second content source.

BRIEF DESCRIPTION OF THE DRAWINGS

Embodiments will now be described with reference to the drawings summarized below. These drawings and the associated description are provided to illustrate example embodiments, and not to limit the scope of the invention.

FIG. 5 shows an example of how a page layout can be configured.

FIG. 6 illustrates an example process for rendering pages.

FIG. 7A illustrates an example relationship between content sets, items, and attributes.

FIG. 7B illustrates the optional use of a unique ID to reference a respective item.

FIG. 13 shows a screenshot of an example embodiment of the user interface for importing a data feed.

DETAILED DESCRIPTION

Figure 1:
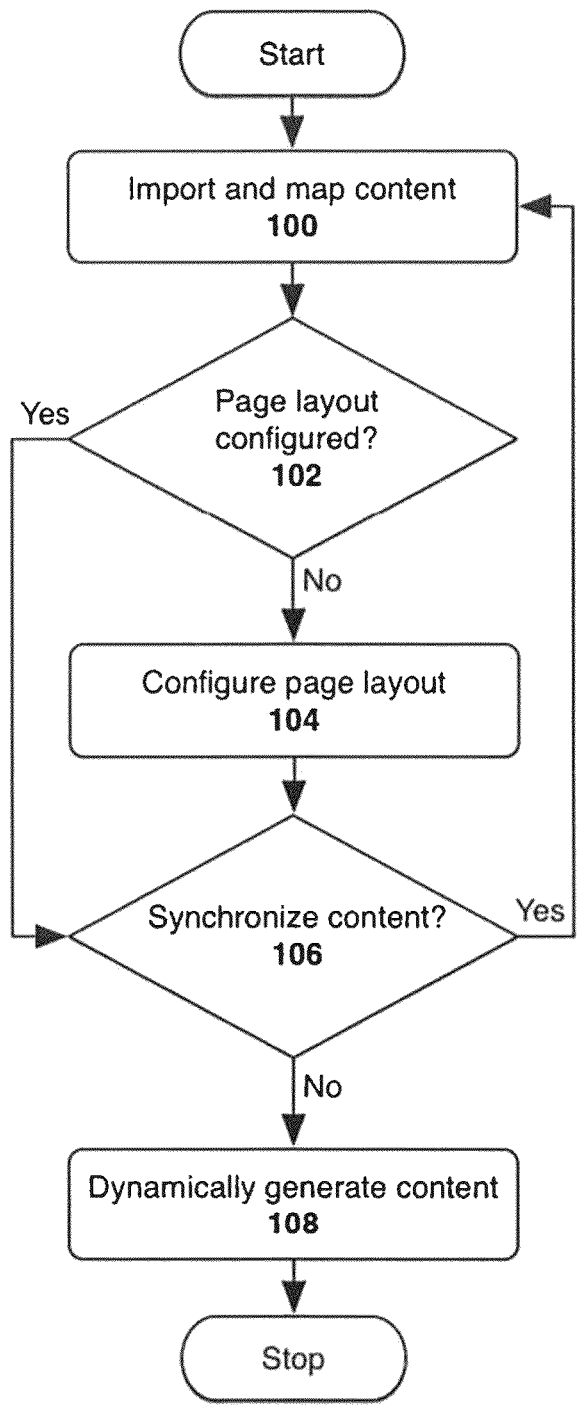
FIG. 1 is an overview of an example overall process for handling content.

Described herein are example systems and methods for managing content.

An example adaptive content management system (CMS) is disclosed that is configured to interact with data without requiring a schema (although optionally a schema may be used). The example content management system (CMS) enables the management and publishing of digital content. In certain embodiments, the content can be in any digital form, such as text, images, videos, and/or audio. The CMS may publish content as pages (e.g., webpages) and/or export content through data feeds to other applications and user interfaces.

An example adaptive CMS will now be described. The adaptive content management system may auto-detect and map content and optionally store the content in a schema-less data store. With a schema-based database, it may be challenging to push data into the database as the data has to perfectly fit the schema. By contrast, with a schema-less data store, data can be pushed directly to the schema-less data store without having to massage the data to match a schema. A standardized user interface (UI) may be used for content (e.g., all content corresponding to the user interface). The described example technique of interacting with content enables the content management system to dynamically generate webpages based at least in part on imported content without requiring custom plugins or custom software development (although such may be used). Optionally, when creating the design for the dynamically generated webpages, users can interact with different imported data feeds through a standardized UI without the need for additional content-specific software.

An illustrative example case will now be described to provide context. In this example, a user manages her digital photographs through an online image-management service. The user wants to display those images on a separate portfolio website (operated by an entity different than the entity that operates the online image-management service), but she wants to continue to manage the photos through the image-management service. This situation is common among users of the image-management service, and so the image-management service may enable its users to export their photographs through a data feed so that the photographs can be displayed on their users' websites.

In this example, the user's portfolio website is built with a conventional CMS (although in other examples a non-conventional CMS may be used), and so a relatively easy way for the user to import the data feed is to look for a specific plugin that imports that specific data feed and then displays that content on a webpage.

A plugin is also known by other names, such as extension, widget, or module. The exact model that each CMS uses to define a plugin may be different, but in general, with respect to a CMS, the term refers to separate software that extends the core functionality of a CMS. A plugin built to work with external data typically handles both ingesting the content and displaying the content.

Unfortunately, with the conventional model, a plugin will typically work with only one type of content having a specific schema. Therefore, if the user wants to import a data feed from a separate image-management service, then she must look for a different plugin that is designed for that specific service. To understand why a conventional plugin will only work with one type of content, the following description of conventional plugin development and how a conventional CMS works is provided.

A conventional CMS stores data in a database that uses a particular structure or schema. To add custom content, such as a data feed from a separate image-management service, conventionally a plugin developer must define a new database table that fits the schema of the content. Because this is a custom table, the developer must then build basic functionality that defines how users can interact with the content. This functionality is often summarized as create, read, update, and delete (CRUD).

The approach of a conventional CMS has some clear disadvantages, including some or all of the following:

To use a particular data feed, a user must find a plugin for that particular feed.

If a plugin does not exist for a particular data feed, then to use the feed, a user must develop a new plugin.

Even if a plugin exists, it will often perform certain functions, but not all the functions a given user wants or needs (e.g., a plugin might import images but not associated captions or alt text). This situation conventionally requires custom development to add the missing functionality.

Adding functionality to another developer's plugin might not be possible or feasible if the code for the plugin is not available to the user for modification.

The behavior of a conventional plugin is dependent on the content that the plugin interacts with. So users must find a plugin that has both the behavior that they want (e.g., formats the content for display in a desired manner) and that works with the content source, making it more difficult to find appropriate plugins.

Using the conventional approach, the administration user interface (UI) of different plugins may work differently. This non-standardized approach makes the user experience confusing. Because a given conventional plugin uses custom CRUD functionality, the plugin developer must decide how the plugin should interact with the administration UI of the CMS. For example, suppose for plugin 1, developer X puts certain settings in menu A and other settings in menu B. For plugin 2, developer Y puts settings in menu C and requires that a user copy and paste a specific code snippet onto each page. These inconsistent approaches are commonly used by conventional content management systems, and degrade the user experience.

If a CMS changes its administration UI in a new version, then a plugin that was dependent on the previous version UI might no longer work properly. By way of illustrative example, suppose in version 1.0 of a CMS, developer X put certain settings in menu A and menu B. If Version 2.0 of the CMS no longer supports menu B, X's plugin can no longer be properly configured.

Plugins typically need to be updated (i.e., the plugin would require additional software development) if the data feed provider changes the structure of the feed. Because of the nature of a schema, conventionally a plugin designed to work with content of one particular schema will only work with content that fits that schema.

When a CMS releases a new version, a plugin might not work with that new version, and a developer would have to migrate the plugin to the new version (i.e., the plugin would require additional software development). Because a conventional CMS stores and calls content in a particular manner, references to that content must take into account that particular manner. Therefore, if that manner of calling content changes, then a plugin might no longer work with the CMS.

Often, content management systems or plugins support multiple feeds by supporting common schemas. If the schema is broadly adopted, then the CMS can use one plugin to support many data feeds. However, even if many data feeds are supported via a broadly adopted schema, there will typically be many data feeds that are still not supported and would need different plugins.

Below, a Program Listing section is provided that includes several illustrative example markups for three different example data feeds: an Extensible Markup Language (XML) feed, a JavaScript Object Notation (JSON) feed, and a comma-separated values (CSV) feed. In this example, these three data feeds all describe the same information, but these three feeds are structured using three different respective markup languages. Using the conventional approach, a plugin designed for the schema of one feed would not work with the other feeds.

In an example embodiment, a content management system (CMS) as described herein can accept and display content regardless of schema by automatically detecting and mapping the schema of imported content (optionally without user intervention) and then by storing the content in a schema-less database. By not committing to or being limited to a particular type of content, the CMS can expose the content to a plugin (e.g., widget, module, or extension) either through an API (application programming interface) that contains methods for calling the content or by injecting the content into the module in the form of a data type such as an array. Because each type of content may optionally be referenced in the same way, the CMS can use a standardized user interface (UI) for multiple plugins or every plugin (e.g., widget, module, or extension). Optionally, the CMS also enables the user of the CMS to determine if content is appropriate for the plugin. Thus, users do not have to create a schema defining the content. With this treatment of content, plugins can work with and receive imported content (e.g., any imported content), regardless of source or schema.

Accordingly, several optional advantages (not all of which need be achieved by a given embodiment) of one or more aspects are as follows:

Any plugin (also known by other names such as a widget, module, and extension) is able to accept any imported content without custom software development, and will attempt to render such content. The user is enabled to determine if the way the content is rendered is as the user intended.

Users without software development abilities can combine several different data feeds for use on their webpages (or otherwise) without installing custom plugins and without employing a software developer.

Changes to the structure of a data feed may be auto-detected and mapped without requiring additional software development to conform to such changes.

A CMS can use a standardized user interface (having the same look and feel) for many or all plugins offered by the CMS, including custom plugins developed by third parties and submitted to the CMS for use by other users. For example, a third-party developer may specify to the CMS which fields are needed (e.g., a text field called "name"), and the CMS determines the appearance of the fields (i.e., the UI), how content will be entered into the fields (e.g., via drop-down menu, text field, check box), and what types of content will be allowed (e.g., static text or references/links to imported content). The third-party developer may then refer to the content in fields, for example, using methods in an API or references to a data type (e.g., an array).

The content of some or all of an entire website can be changed by just synchronizing a different data feed—also, without the need for additional software development.

An example embodiment of a process of importing and rendering content for a given page (e.g., one or more webpages) with an adaptive content management system (CMS) is illustrated in FIG. 1. The example process will be described in greater detail with reference to other figures.

Referring to FIG. 1, at state 100, the CMS imports and maps content from a data (content) feed specified by a user. A state 102, a determination is made as to whether a page layout (for the page which will use content from the feed) is already been configured. The page layout describes which content is included in a generated page. If a page layout is not already configured, then a page layout is configured at state 104. Once the page layout is configured, optionally the content can be synchronized at state 106; for example, a determination may be made as to whether the feed has been updated since it was last imported. If the feed has been updated, then the content for the page may be updated/synchronized. With the content imported and the page layout configured, at state 108 the CMS may dynamically generate pages (to be rendered on a user terminal, such as a browser equipped computing device) based at least in part on the content from the feed.

Import Content

Figure 2:
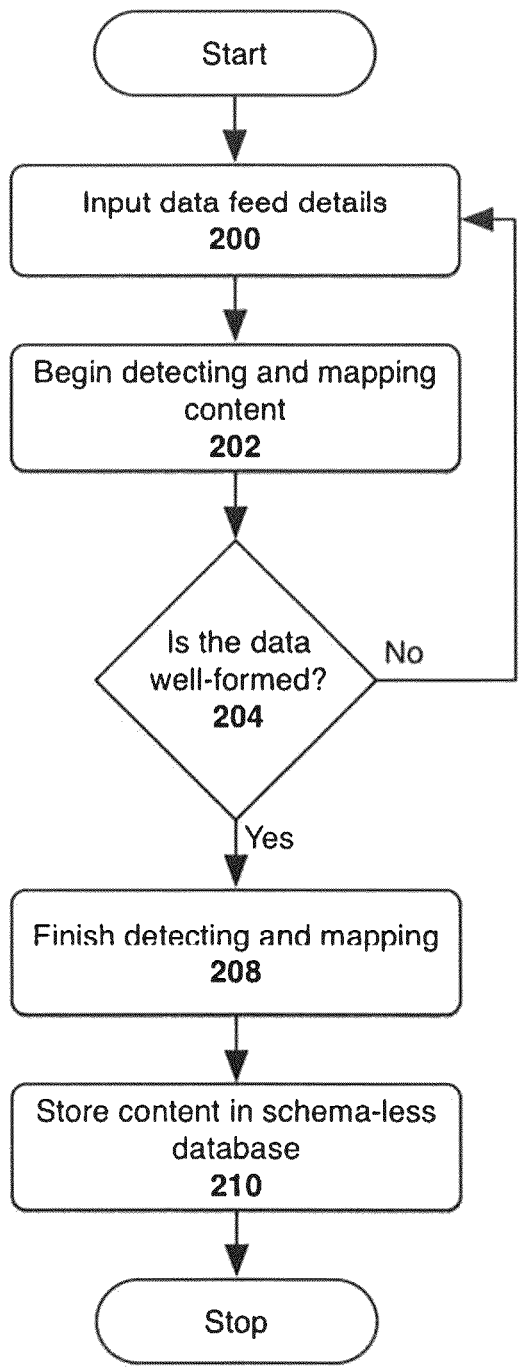
FIG. 2 illustrates an example process for importing content.

An example import process (corresponding to state 100 in FIG. 1) is illustrated in FIG. 2. To identify the feed, the adaptive CMS uses information about the feed 200, such as the location of the feed (e.g., the URL or local directory) and information on how to access the feed (e.g., username, password, port, server, and/or path). For example, optionally the location and/or access information may be received from a user, where the information may be entered by the user in fields presented by a data feed specification user interface. Other embodiments, such as those discussed below and illustrated in FIG. 8A-D, may use more or less feed information. Optionally, the CMS may verify the feed information to determine whether it is valid or not. For example, if, when attempting to retrieve data from the feed, the CMS receives an HTTP 404 Not Found error, then the CMS determines that the URL provided is invalid. Optionally, if the information is determined to be invalid, the user may be informed via a notification user interface and the CMS may prompt the user to enter correct feed information. If the CMS receives new information from the user, the CMS may again verify the information.

If the feed information is valid, at state 202, the CMS can begin mapping the content. By way of example, the content may be in the form of a flat file, XML, JSON, CSV, and/or other form.

If the data is well formed (has proper syntax), then the CMS can accurately map the data 208; otherwise, the process can optionally return to the input state 200. Optionally, certain embodiments may guess or infer the appropriate structure of malformed data (e.g., HTML code with syntax errors). For example, the CMS may search for a specific pattern (e.g., using a regular expression) of malformed markup (e.g., an opened but not closed element, unescaped character entities, malformed HTML tags, improperly nested HTML elements, etc.). Optionally, the CMS may correct certain malformed date (e.g., by replacing the malformed markup (e.g., by closing the element before the next element is opened)). Generally, with respect to a markup language, well-formed data complies with the basic rules/syntax of its markup language (e.g., all opened elements are also closed, elements are properly nested so that they do not overlap, proper delimiters are used, etc.).

Conventional approaches for automatically mapping data force content to fit a particular schema. Such conventional approaches fail to alleviate disadvantages mentioned previously. Optionally, rather than using such conventional approaches, the example embodiment illustrated in FIG. 2 uses data mapping to create a CMS database based at least in part on the relationship of the imported data (e.g., see the example Program Listings below). So once mapped, the data is optionally stored in a schema-less database 210 that does not rely on a fixed data model. Thus, the organization of the database can adaptively change in the future in response to changes in the structure of the content. An example process comprises storing the imported content through key-value stores (e.g., highly optimized key-value stores, document-based store that stores documents made up of tagged elements, etc.), such as in the data structure of a programming language (e.g., an associative array), although other techniques may also be used.

For example, the illustrative Program Listing below includes an associative array based on the relationship of the data in any one of the feeds shown in the Program Listing.

Thus, using key-value stores, data may be stored in a programming language data type or an object, and so a fixed data model is not required. Indeed, utilizing this technique of content import and storage, the three different example data feeds shown in the Program Listing section would each be stored and referenced in the same way because the relationship of the information (and the information itself) is the same across all three data feeds.

It is understood that certain embodiments may not utilize mapping (e.g., where the user defines his or her own content set rather than using a third party feed).

Configure a Page Layout

In an example embodiment, to use imported content, the adaptive CMS applies the content set model, but other models may also be used. For example, another suitable model uses the columns and rows technique, which represents data like a spreadsheet: separating data into individual rows that are defined by columns. For example, in a spreadsheet of user information, each user might be represented by a separate row, and the columns that define each user might include Name, Email, Password, and Phone number columns. A page layout can then be configured to use certain columns. The page layout may be used to generate dynamic web pages when passed different rows. The content set model (described below) is similar to the columns and rows model, but the content set model is more abstract, and it, therefore, has certain advantages for conceptualizing complexly organized data. For example, deeply nested elements where one element is actually an array (e.g., an array of images) of arrays (e.g., alt text, link, and URL of the image) may be utilized.

The content set model comprises a high-level organization, an example of which is illustrated in FIG. 7A. A given imported data feed is organized into a separate content set 700. For example, a data feed for a blog might be a content set. The content set is then organized into items 702. For example, if the content set is the feed for a blog, then a given item may correspond to an individual blog post. Each item is then organized into one or more attributes 704. For example, if each item is an individual blog post, typical item attributes might, in this example, include title, author, posted date, categories, and blog body.

In the content set model, each item of a given type has the same attributes, but the value of the attributes might be different across items. Consider an example of a content set based on a blog: each blog post (each item) has a title (an attribute), but the value of the title is probably different for each blog post—the value of the title for one blog post might be "How to Properly Steep Peppermint Tea," and the value of the title for another blog post might be "The Secret to Preparing Al Dente Pasta."

Using the model shown in FIG. 7A, attributes of any imported content can then be used to dynamically generate pages, such as web pages. The page generation process is described in greater detail below. In the example embodiment illustrated in FIG. 5, the layout of a page is determined, at least in part, by assigning attributes (such as 504, 506, and 508) to modules (such as 502). This page layout is stored by the CMS so that the renderer (which is described later) can access it in order to properly generate a page. In the content set model in the context of the disclosure herein, a module (also referred to by other names such as a plugin, widget, or extension) is software that interacts with the CMS to perform a specific function such as display text or an image. Modules may be used to generate each element of the page layout. For example, text on the page might be generated by a Text module, videos on the page might be generated by a Video module, and an interactive map on the page might be generated by a Map module.

In this example embodiment, each module is encapsulated to first accept input in high-level terms (e.g., text, image, or HTML), to execute code that transforms the input in a particular way (e.g., transform a URL of an image into HTML describing the image), and to output the transformation. A given module in this example does not expect the original content to fit a particular schema or to be from a particular source, and so a module can accept any attribute of a given item type of any content set.

This example process also enables a module to interact with a given item attribute through a standardized administrative user interface (UI). As described earlier, the conventional approach requires the developers of custom modules (or plugins) to create their own database table and CRUD functionality, which prevents a conventional CMS from using a standardized administrative UI for custom modules. However, with the adaptive CMS, because modules are not dependent on specific content and because the content conforms to the content set model (as described earlier and illustrated in FIG. 7A), the adaptive CMS is able to create a standardized UI for each module, including for custom modules designed by third-parties. For the CMS to create the UI, the developer of a module gives the CMS a high-level description about what type of fields will be needed. For example, this information may include type of content (e.g., image, text, integer), the name of the element, a label to appear in the UI, and so on. The CMS may start with a template defining the appearance the administrative UI, and then the CMS populates the template with this descriptive information. This way the CMS creates a UI that is both customized to the needs of each module, and standardized across the modules.

Figure 10:
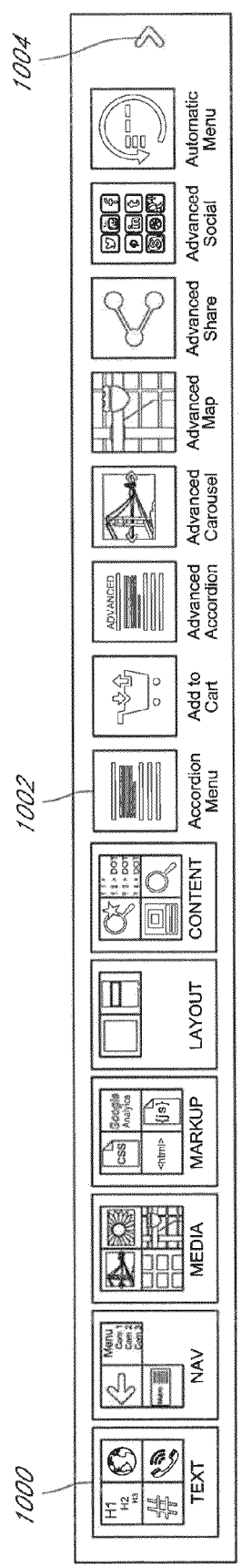
FIG. 10 shows a screenshot of an example embodiment for importing a data feed.

The CMS may host or provide access to a library of modules from which a user can select and configure to control the look and feel of data (accessed from data sources via the module) that will be displayed on a page. An example screenshot of the interface for the library is shown in FIG. 10. The example shows some modules grouped into categories according to use 1000, other uncategorized modules 1002, and a button that, when clicked, displays additional modules 1004. For example, the library may include an image slide module, a blog module, a news feed module, a financial data module, a sports score module, a video playlist module, a graphing module, a responsive menu module, a shopping cart module, a map module, a search module, a text module, a navigation module, a markup module, a layout module, a content module, an accordion menu module, a carousel module, a share page or content module, a social media module, and/or other modules.

As will be discussed below, the user can configure a given module for their specific use without having to code the module and without having to know the schema used by the data source. Thus, user configuration of a module, rather than user coding of a module, enables a module to be used with multiple data sources and for different pages. For example, menu selections may be provided (e.g., via a drop down menu or otherwise) for various item attributes from which the user may select. A given module may be used with a variety of unrelated content sources. By way of illustration, the same image slide module (used to present a slide show of images on a webpage) may be used to obtain images feeds from multiple data sources (e.g., Picasa®, Flickr®, Facebook®, Photobucket®, etc.). The user is spared from learning the particulars of the data sources interface or schema, and from having to obtain code or ask for customization from the data source. Further, as noted above, optionally the various modules available from the library have the same look and feel with respect to the user configuration interface. Having a consistent look and feel makes configuration of the modules less confusing and more efficient for the user. Optionally, the CMS may include a module uploading interface which enables users to contribute modules to the library for use by other users.

Figure 11A:
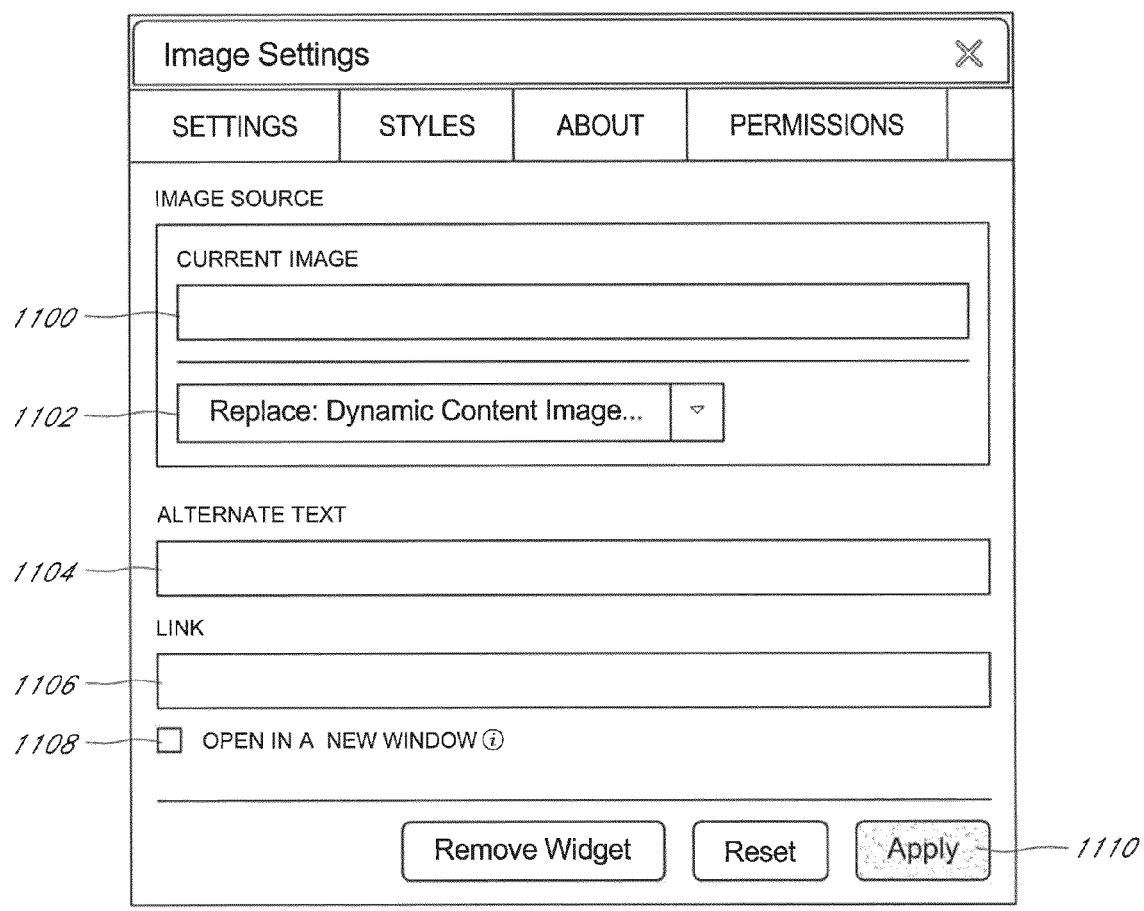
FIG. 11A shows a screenshot of an example embodiment of a user interface for configuring an Image module.

To add content to a module, users associate attributes from a content set with the fields of a module. One example module is the Image module. For example, FIG. 11A illustrates an image module configuration user interface with common fields that might be used for an Image module, such as:

Current Image 1100. For example, users may set this field to an attribute that contains the URL (or other locator) of an image.

Image drop-down menu 1102. Users may use this menu to manually select an image that they had previously uploaded to the site.

Alternate Text 1104. If the image cannot be displayed, then the text entered in this field is displayed instead.

Link 1106. Once the website is rendered, if visitors click the image, they will be directed to the URL entered in this field.

Apply button 1110. This button allows users to save configuration settings.

A "remove widget" control is optionally provided. In response to a user activation of the "remove widget" control, the CMS will delete the module. A "reset" control is optionally provided. In response to a user activation of the "reset" control, the module fields will be reset to their initial state (e.g., empty).

Figure 12A:
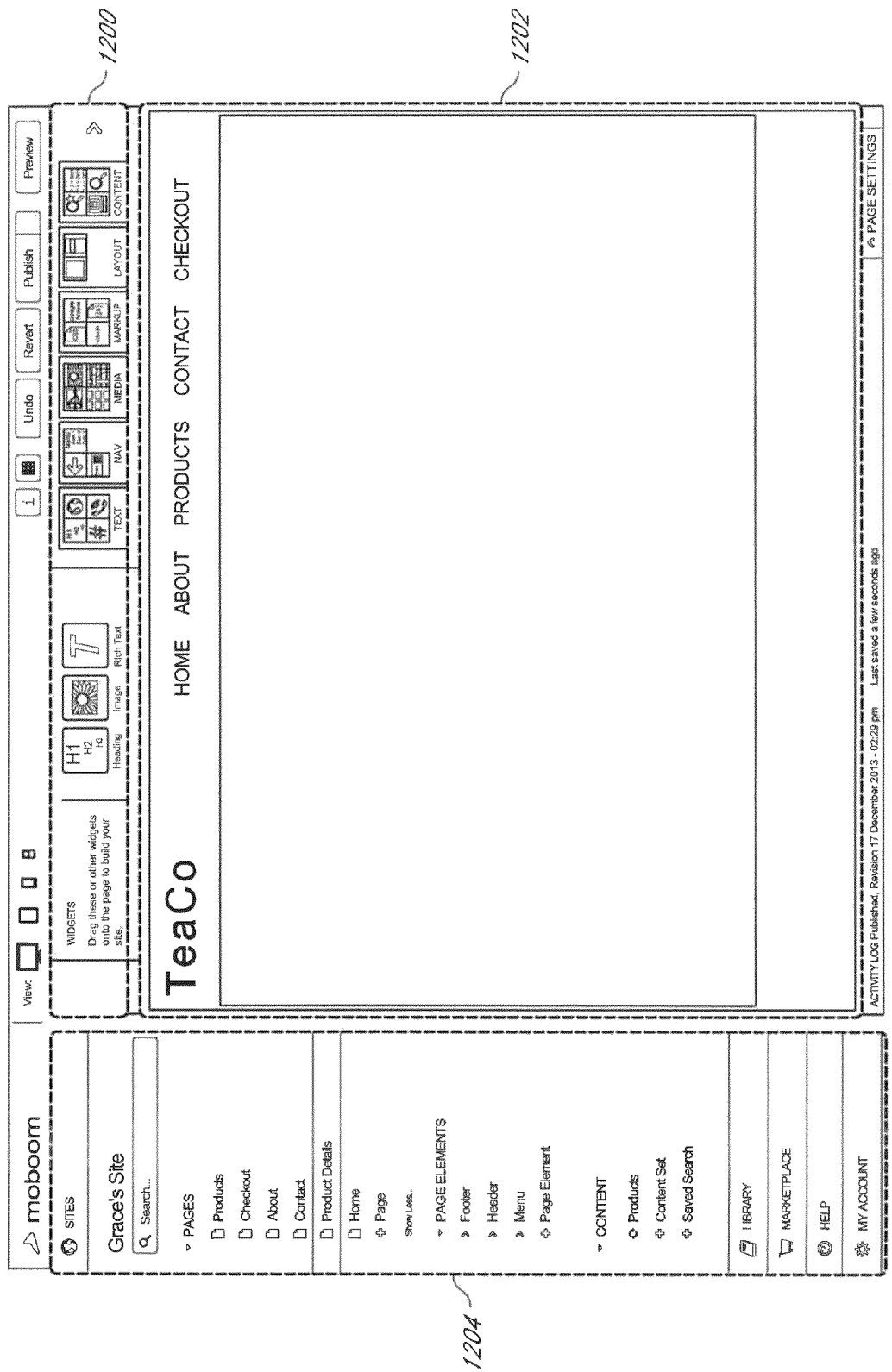
FIG. 12A shows a screenshot of an example embodiment of a user interface for configuring a page layout, including a blank preview screen.
Figure 12B:
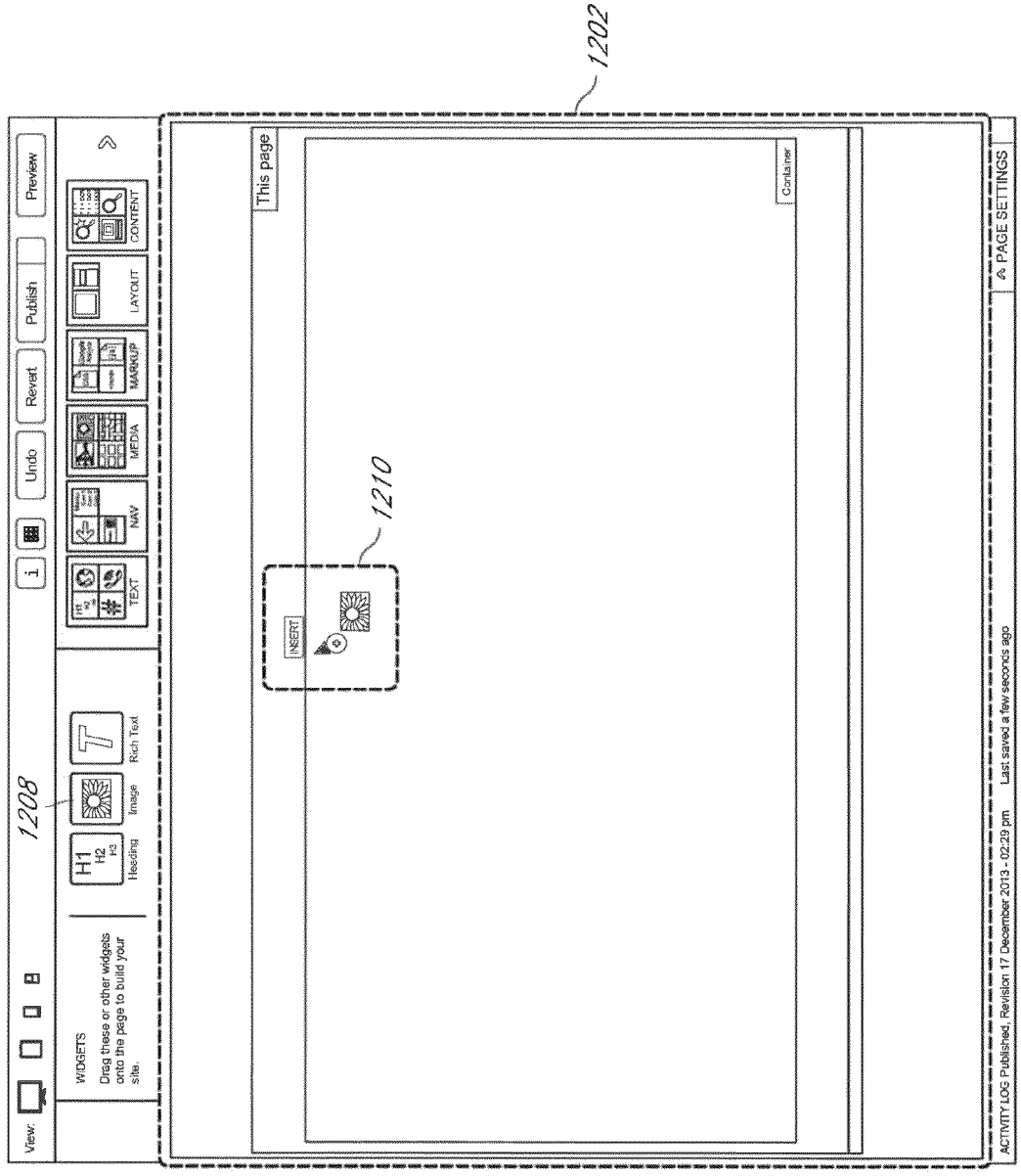
FIG. 12B shows a screenshot of an example embodiment of the user interface for adding a module onto a page layout.
Figure 12C:
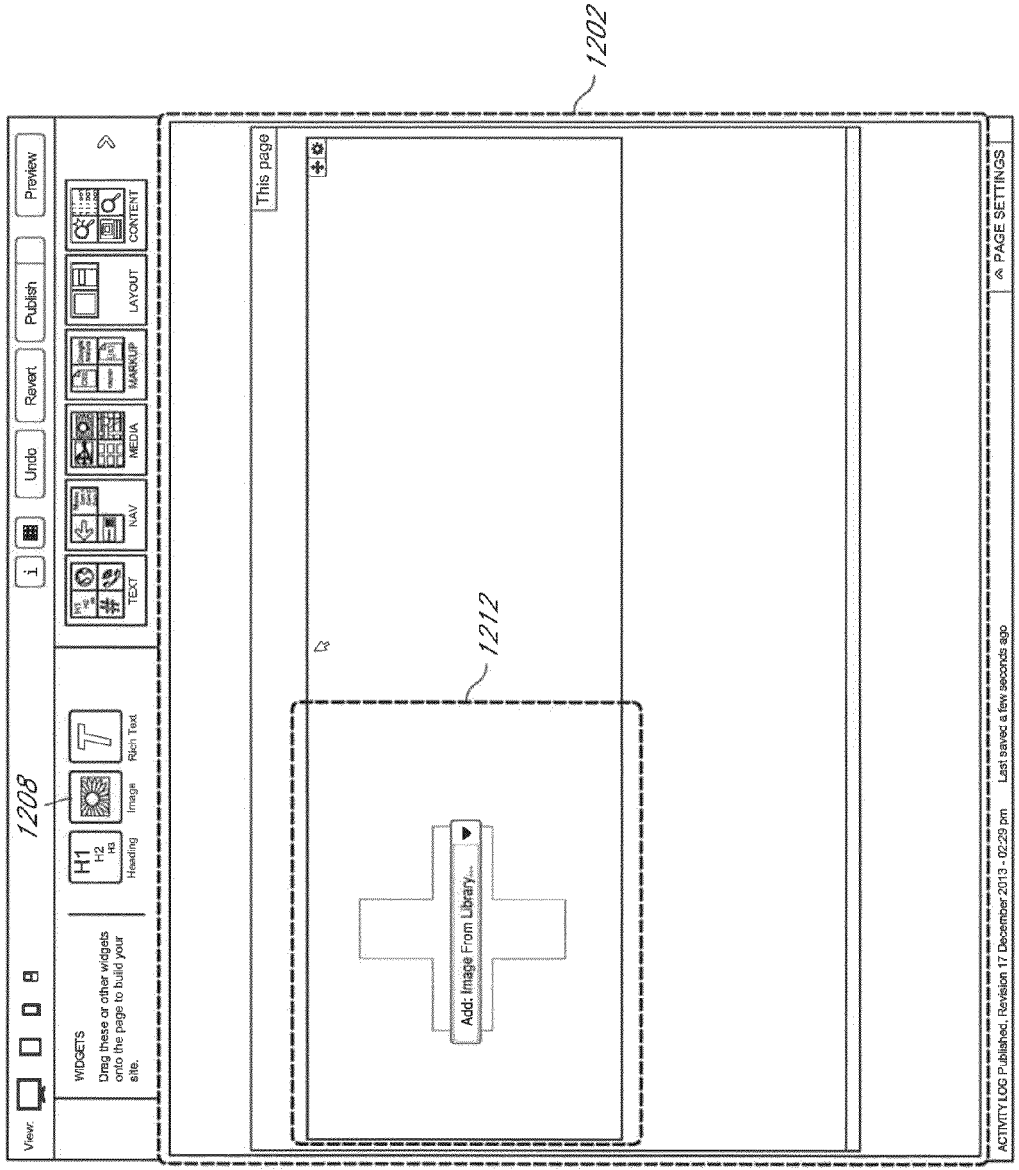
FIG. 12C shows a screenshot of an example embodiment of the user interface for configuring a page layout, including an un-configured Image module.
Figure 12D:
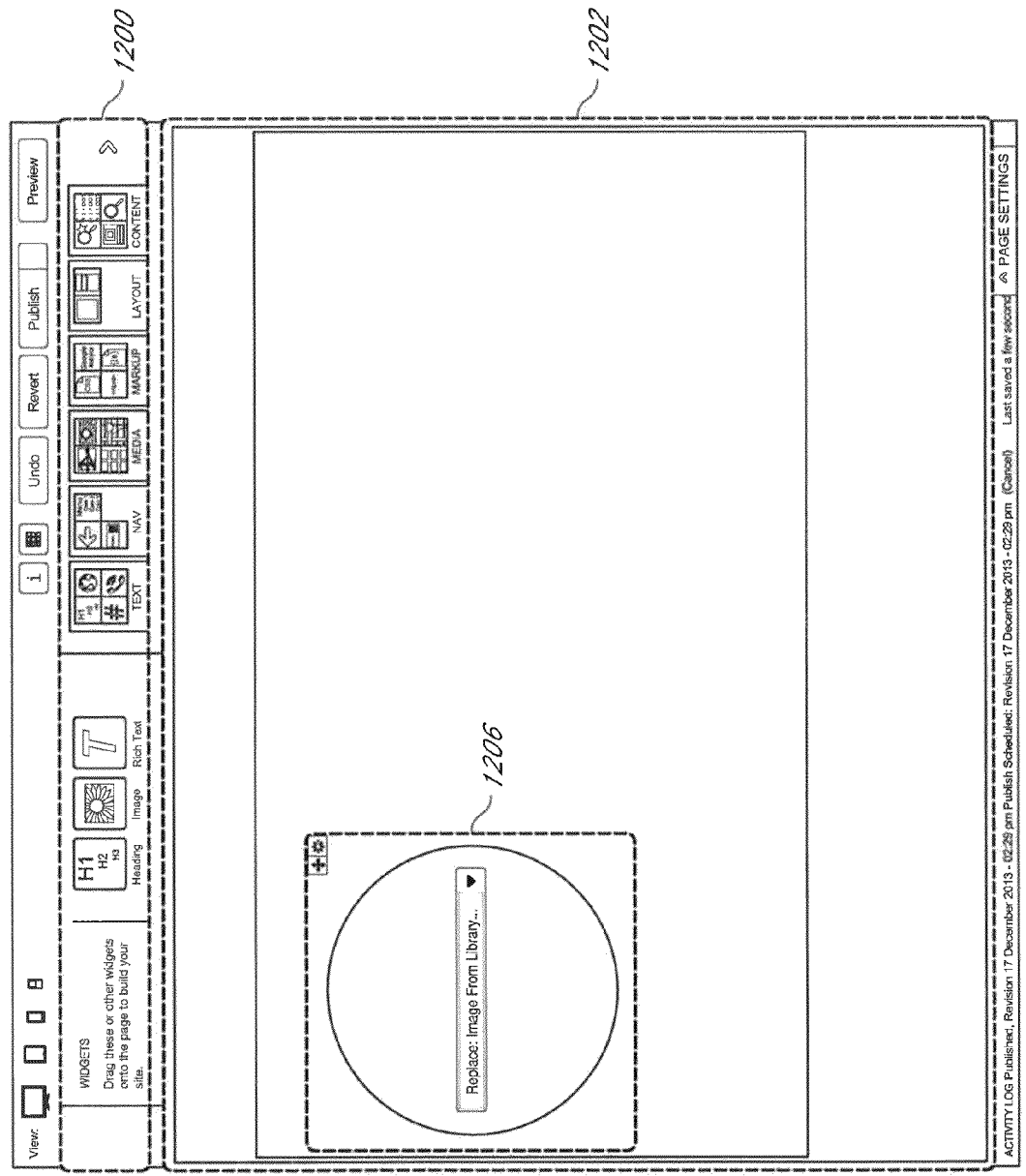
FIG. 12D shows a screenshot of an example embodiment of the user interface for configuring a page layout, including a configured Image module.

Optionally, a preview mode is provided where, in response to a user configuration and user preview instruction, the CMS causes a preview of how a page (or a portion thereof) will look (e.g., when rendered by a browser) given the current user-specified module configuration. FIG. 12A illustrates an example instance of a preview user interface before a user has added any widgets. A library of widgets 1200 (which is also separately represented illustrated in FIG. 10) that users can use to build the page layout is illustrated at the top of the user interface. A navigation menu 1204 to navigate the CMS is shown on the left of the user interface. The preview itself is represented by layout area user interface 1202. FIG. 12D depicts the example preview screen (with the navigation menu cropped out) after a user has added and configured an Image module 1206.

Figure 3:
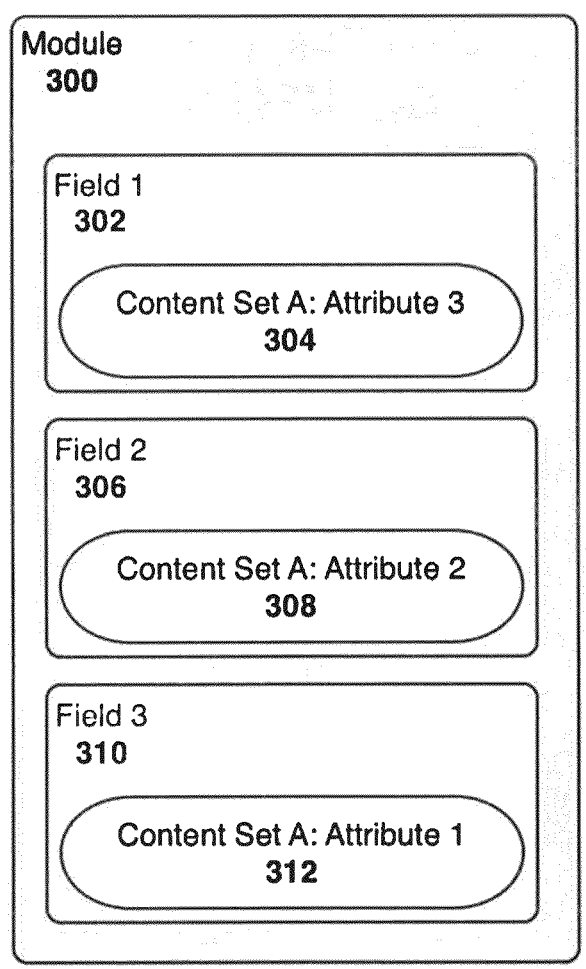
FIG. 3 illustrates an example of how imported content is configured for display.

In the example embodiment illustrated in FIG. 3, the user interface of a module 300 has three fields: field 1 302, field 2 306, and field 3 310—although, the number of fields may vary between modules. For example, a module for an image might have four (or other number of) fields: image, alt text, image link, and caption. To facilitate the generation of dynamic pages, the fields accept references to attributes, as shown by 304, 308, and 312. A module may determine how content is displayed/rendered. For example, if the module is configured to display an image and associated text (e.g., alt text and a caption), the module may determine the resolution the image will be displayed in, the text font, the text font size, and the position or other formatting of the text. The specifics of dynamically generating a page are described in greater detail below.

Figure 4:
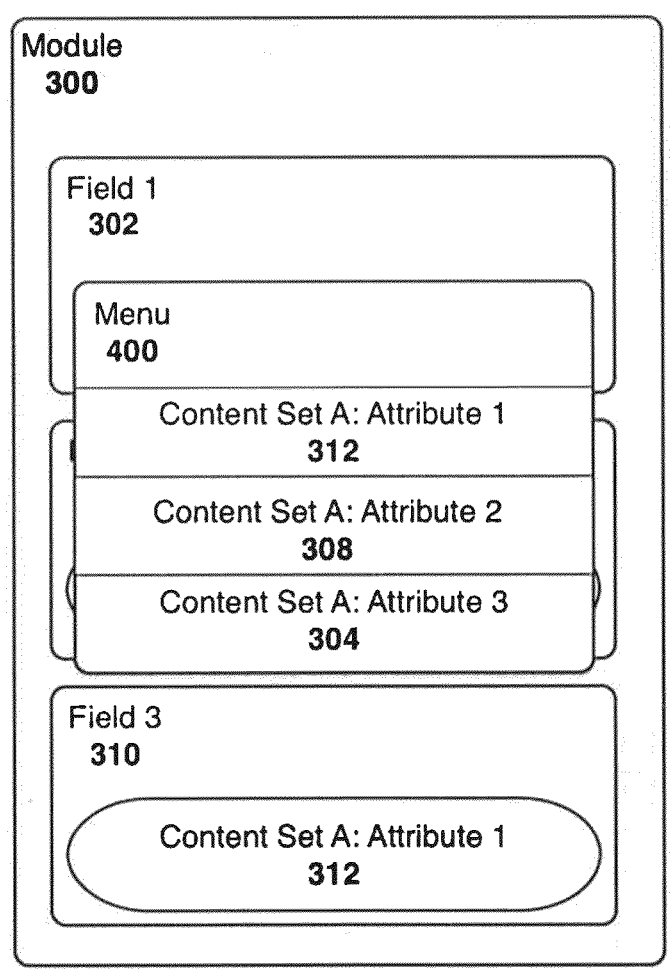
FIG. 4 illustrates an example of how attributes can be selected when configuring content for display.

While FIG. 3 has attributes already selected for each of its fields, the example embodiment shown in FIG. 4 uses a menu 400 to illustrate that any available attribute can be applied to any of the fields. For example, the function of a given module could be to display an image (from a content source). In this example, one field might accept an attribute containing a URL for the image and another field might accept an attribute containing a caption for the image. Thus, rather than requiring a user to program a module for a specific content source, the user may specify which attribute is to be applied to which field via an easy to use menu interface (by selecting a desired menu entry), where the menu choices for each field may include all the attributes applicable to the module. For example, the menu selections for a module configured to display an image may include: image, link, and caption.

The module may optionally treat each attribute the same, so the user determines and specifies which attribute is appropriate for which field. For example, if one field is designed to accept the URL for an image, a user can select an attribute (from the menu 400) that contains the caption for that image. In that case, the module would still use the attribute, and the module would attempt to display an image using the caption as the URL. The resulting HTML would most likely not display an image. While this method has the possibility to, for example, create broken images, the method also allows the content of any data feed to work with any module.

In an example embodiment, for the CMS to implement the administrative UI of a module, a module communicates to the CMS an identification of what high-level content it needs (e.g., text for two text fields and an image for one image field), and the CMS applies a standard UI (as described earlier and as illustrated in FIG. 3). Optionally, along with the fields, the module might also communicate clarifying information such as the name of the fields (e.g., Caption, Alt Text, and Image), the arrangement of the fields (e.g., first Image, then Alt Text (alternative text associated with an image that serves the same purpose and conveys the same or corresponding essential information as the image), and then Caption), and tooltips text (e.g., "Alt Text is alternative text that will be displayed if the image cannot be rendered"). As is understood, a tooltip may be in the form of a hint or prompt that appears when a user hovers a cursor/pointer over and/or adjacent an item for a specified period of time.

FIG. 5 illustrates an example of a page layout 500 that includes two modules (although fewer or additional modules may be added by a user). While FIG. 3 shows the UI that enables a module to use an attribute, FIG. 5 illustrates how modules display content based on those attributes. The modules can be arranged in any order, and each module might have a different functionality. For example, if the original data feed contained URLs for images, then one module might use the URLs to display the images, while another module might use the URLs to display links to the images. The module determines how the data is displayed. The CMS provides a user interface via which the user can select modules from a module library and drag and drop the modules onto the page layout interface to specify where the data from a given module is to be displayed on the page. FIG. 12B illustrates an example process of dragging an Image module 1208 onto a page. The module will be inserted at the location indicated by outline 1210. In FIG. 12C, the Image module has been placed on the page. A gray box and outline 1212 indicate the placement of the module. The CMS will then store the corresponding layout in memory.

The example page layout in FIG. 5 comprises two example modules: 502 and 510. In this example, module 502 is set to use three attributes: 504, 506, and 508. Module 510 is also set to use three attributes: 512, 514, and 516. In this example, module 502 is configured to display the attributes as circles and module 510 is configured to display the attributes as squares. While each module uses a different method to display these attributes (module 502 displays the attributes as circles and module 510 displays the attributes as squares), the content that the modules display is based on the content of each attribute.

Referring to the blog example described earlier, if a page layout represents a blog post, then one module might display a heading by using a title attribute, another module might display an author's name using an author attribute, and another module might display the text of the blog using a body attribute. The module may display a given attribute accordingly (e.g., the title may be displayed first with a first font size, the author's name may be displayed centered just beneath the title in a second font size that is smaller than the first font size, and the blog body may be displayed beneath the author's name in a third font size).

FIG. 7B illustrates an embodiment that contains an identifier (e.g., a unique ID 706) for each item. The ID can be used as a parameter to reference each item 702, but other techniques for referencing a particular item may also be used. So while the page layout 500 specifies particular attributes, the layout does not specify a particular item, meaning that one page layout can be used to display the attributes of any item in a content set. Using the previous blog example, a blog post layout can be created once using one or more modules, and then the same blog post layout (the same modules) may be used to display each blog post in a content set.

Generate a Page

An example page generation process will now be described with reference to FIG. 6, which illustrates an example page layout technique that may be executed by the CMS to generate a page (e.g., a webpage). A request 600 is sent to the renderer 610. Typically, this request would be sent by a web browser or other requester hosted on a user terminal (e.g., a mobile communication device (e.g., a mobile phone), a desktop computer, a laptop computer, a tablet computer, a smart television system, etc.) over a network (e.g., the Internet) to the renderer 610 which receives and processes the request. The renderer 610 may optionally be hosted on a system separate from the content source (physically separate from and operated by a different entity than the content source), or the renderer 610 may be hosted on the same system as the content source. The renderer 610 may comprise a software engine, which may be part of the CMS.

Referring again to FIG. 6, the renderer 610 receives several requests (e.g., from the user browser): requests 602, 604, 606, and 608 in this example. In this example, each request includes a unique ID, which is a request for a particular item. For example, request 602 includes "id=triangle," which is a request for the item with the unique ID equal to "triangle."

As described earlier, the ID 706 determines, at least in part, what item 702 is displayed, and the page layout 612 (defined using one or more modules) determines what attributes 704 to display and how to display those attributes. For example, request 602 is a request for the item with the ID "triangle." As item 616 (corresponding to the "triangle" item) illustrates, that item has several attributes, and the page layout 612 requests three of these attributes (which may be fewer than the total number of attributes associated with the item).

The renderer 610 then generates webpages 624 based at least in part on the requested items 600 and the page layout 612. For example, the request for "id=triangle" 602 causes the renderer 610 to generate a webpage represented by generated page 626.

With this process, a single page layout can be used to generate multiple webpages with different content. The data feeds shown in the Program Listing section would each generate one content set with three items, and one page layout could therefore be used to create three pages in that instance.

Optionally, the page layout, the renderer, the code for the modules, and/or the generated webpages may reside on the CMS.

Process Overview of Example Embodiments

To further elucidate the process of the first example, this section will describe a hypothetical example where a user imports a data feed, configures a page layout, and where the renderer generates a webpage. To provide additional clarification, this section will also reference example screenshots of the user interface (UI) for an example embodiment of the CMS, but other UI designs are also suitable.

In the hypothetical example, a user wants to import an XML feed that contains a list of products. This XML feed is shown in the Program Listing section. The user then wants to use this feed generate an individual webpage for each product.

Import

To ensure that the data feed is accurately mapped, the user provides the CMS with following details about the feed (a screenshot of this example step is shown in FIG. 13):

Name 1300. The Name enables a user to later distinguish between multiple content sets. Because the name optionally is only used to provide clarity to the user, the name could be any word, phrase, number, etc. In the hypothetical example, the user used the name "Products," so the CMS will refer to the feed as the "Products" content set.

File Format 1302. The File Format specifies how the file is encoded and what markup language is used. In the hypothetical example, the feed is in XML format.

Location 1304. The Location field specifies how the file is stored (e.g., if the file is stored on an FTP, on the web, or locally). In the hypothetical example, the feed is located on the web.

XML Document Element 1306. As described previously (and as shown in FIG. 7A), the CMS may organize data feeds into separate items. This field asks for the document element that surrounds each item in the file. In the hypothetical example, this element is called "tea."

ID 1308. As described previously (and as shown in FIG. 7B), each item may be assigned a unique ID. This field asks for the name of the element/field in the source data containing the unique ID (which can be used to uniquely identify the record). In the hypothetical example, this element is called "id."

URL 1310. The URL is the location of the data feed. In the hypothetical example, the URL is "http://example.com/feeds/teas.xml."

Username 1312. If the feed is password protected, a username might be required, and so the user name may be inserted into this field. In the hypothetical example, the feed is not password protected, so this field is left blank.

Password 1314. If the feed is password protected, a password may be required, and so the password may be inserted into this field. In the hypothetical example, the feed is not password protected, so this field is left blank.

Once the details have been entered, the user clicks the "Create" control 1316 to begin the mapping and import process (as shown in FIG. 2). The preceding are optional features details of an example embodiment, and different, more, or fewer features may also be used. Additional discussion of example features and details that may be beneficial to the import step is provided below in the Additional Example Embodiments section.

In this example, the CMS maps the XML data feed so that there are three items, because the data feed has three tea elements, and each item has the following attributes:
id
name
caffeine
type
description
price
image
thumb Each attribute corresponds to an element in the data feed. As discussed above, the CMS optionally stores the data in a schema-less database (see, e.g., block 210, FIG. 2), and an optional storage method involves storing the imported content in key-value stores such as in the data structure of a programming language (e.g., an associative array), but other methods may be used.

Figure 14:
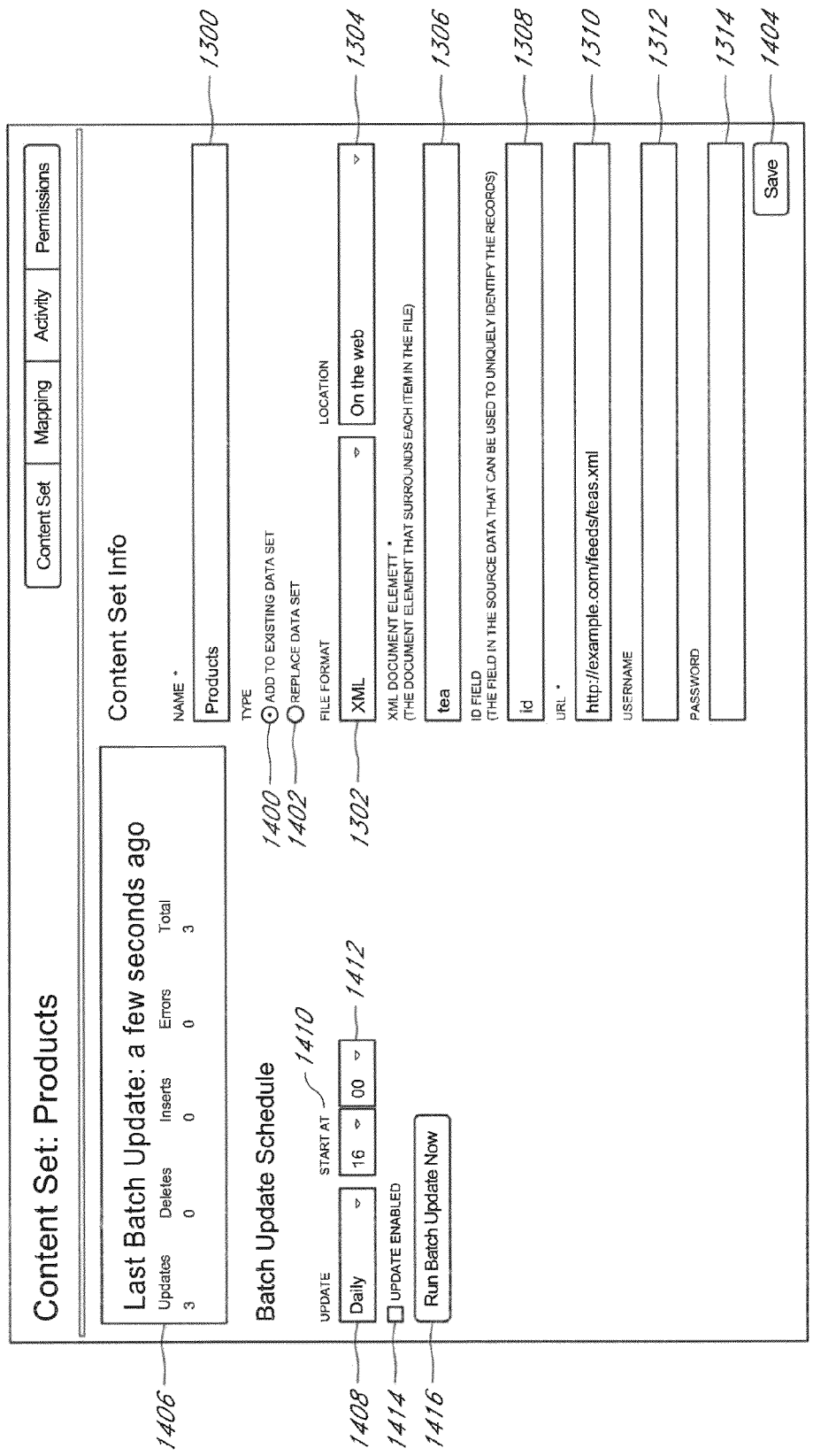
FIG. 14 shows a screenshot of an example embodiment of the user interface for configuring the synchronization details of a data feed.

Once the data feed has been mapped and stored as the "Products" content set, the CMS displays a configuration user interface to the user (an example of which is shown in FIG. 14), but other methods of confirming that the content set successfully imported may be used. The configuration screen provides the user with information about the last time the content set was updated via an update status user interface 1406.

Because the content of the feed is controlled externally to the CMS, the content of the feed and the content stored in the CMS might become unsynchronized. To keep the content synchronized, the user can either (1) manually synchronize the content by manually activating a "run batch update" control 1416 or (2) set a reoccurring update via an update scheduling user interface 1408-1414, which enables the user to specify a start time and the update period (e.g., hourly, every 4 hours, daily, weekly, etc.). The manual and auto-synchronization features are further discussed below in the Additional Example Embodiments section.

Using the example configuration user interface illustrated in FIG. 14, the user can configure how the CMS treats updated content. For example, if the Add to Existing Data Set function is enabled (via control 1400), tea elements deleted from the feed are not deleted from the synchronized content set, but any updates to tea elements (e.g., if a description is changed) are updated in the synchronized content set. However, if instead, for example, if the Replace Data Set function is enabled (via control 1402), any tea elements deleted from the feed are deleted in the synchronized content set.

Additionally, the configuration user interface illustrated in FIG. 14, enables the user to adjust/modify the details that she entered initially via fields 1300-1314 in case any of the details of the feed change in the future. Optionally, the user may save such modifications by activating the Save control 1404, but other methods for saving changes may be used.

Configure a Page Layout

Once the feed is imported, the user can configure a page layout to use the imported content. A depiction of a blank, un-configured layout area user interface 1202 is shown in FIG. 12A. To build the page layout, the user uses modules. As described earlier (and as shown in FIG. 5), optionally every element in the page layout is a module. For example, to add an image to a page, the user would add an Image module, and then configure the module, through its UI, to accept the URL (or other locator) of an image (which is described in more detail later and shown in FIGS. 11A-C). To add an interactive map, for example, the user would add and configure a Map module.

As described earlier (and illustrated by FIGS. 3-4), optionally each module will accept attributes from any content set, which means that any imported data feed may provide these attributes. Therefore, when selecting a module, the user looks/searches for a module that performs a particular action, such as a module that displays text or a module that displays an image.

Figure 15:
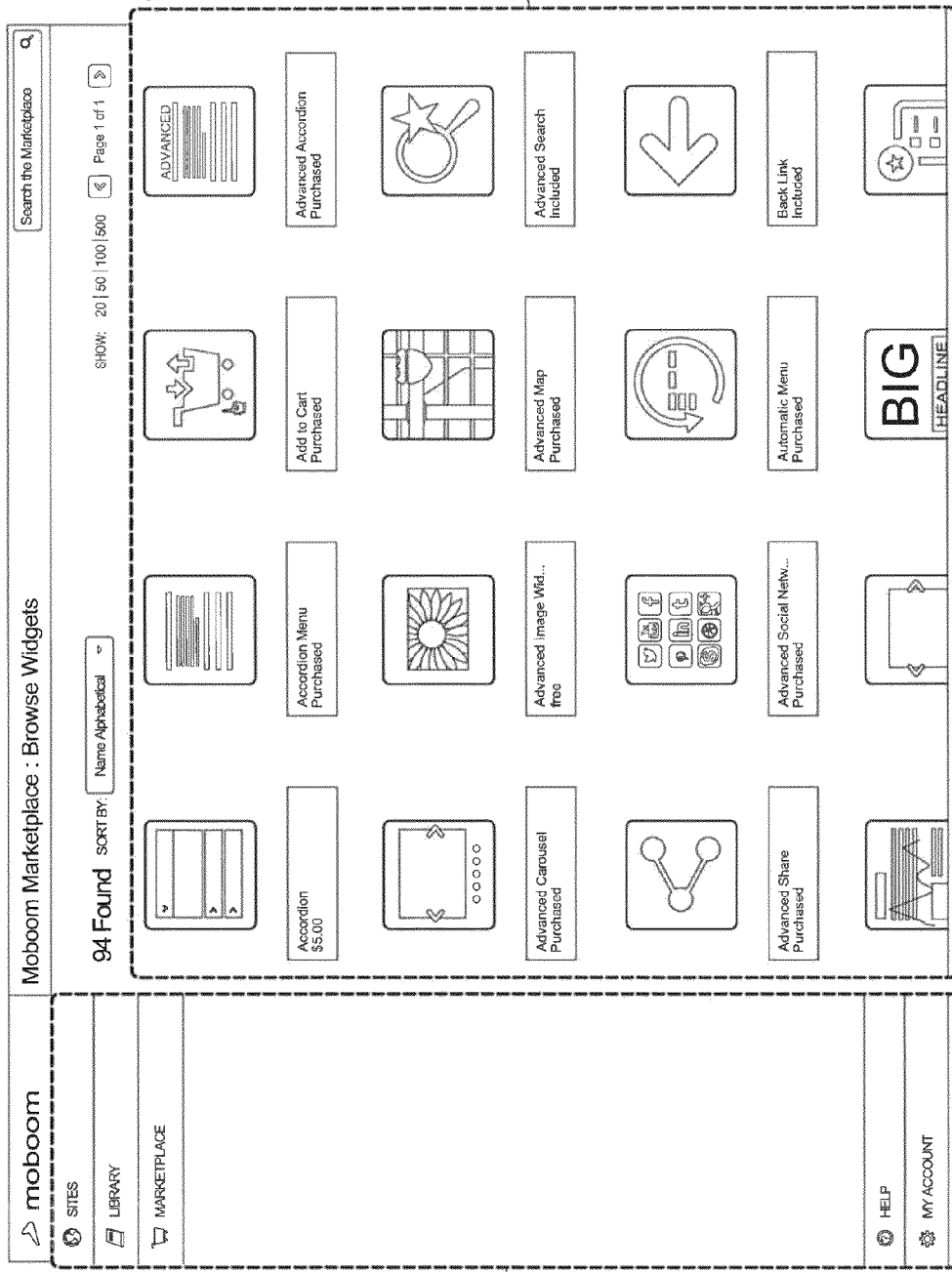
FIG. 15 shows a screenshot of an example embodiment of the user interface for a marketplace, which allows users to add additional modules.

Some modules are available by default, and the user can select these modules from the toolbar 1200 on the same screen as the page layout area user interface 1202. Referring to FIG. 15, a user interface 1502 is optionally provided via which the user can also select and obtain other modules from a widget marketplace. In this embodiment, the widget marketplace contains modules created and submitted by third-party developers. The 1200 toolbar and widget marketplace 1502 are example techniques which may be used to provide users with a variety of modules from which to select, but other techniques may also be used.

Figure 11B:
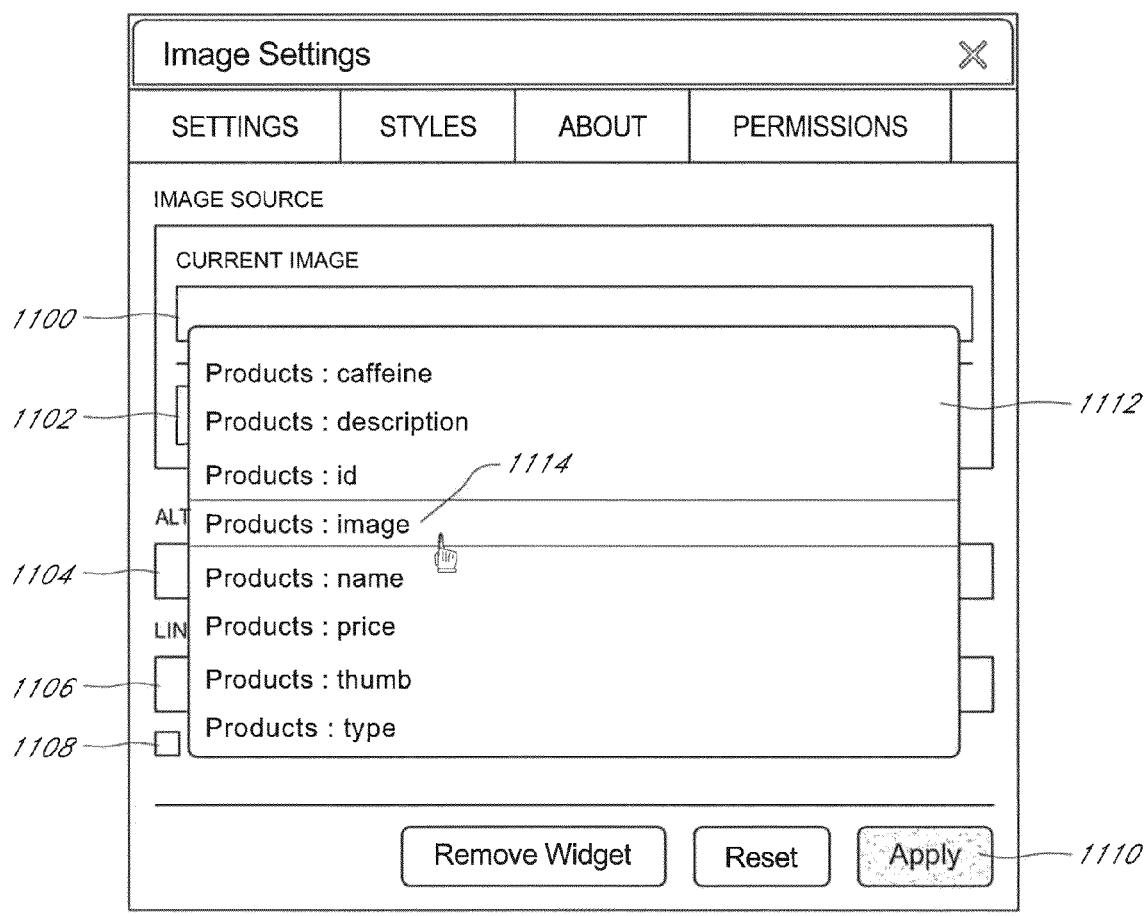
FIG. 11B shows a screenshot of an example embodiment of the user interface for configuring an Image module, including a menu for selecting attributes from a content set.
Figure 11C:
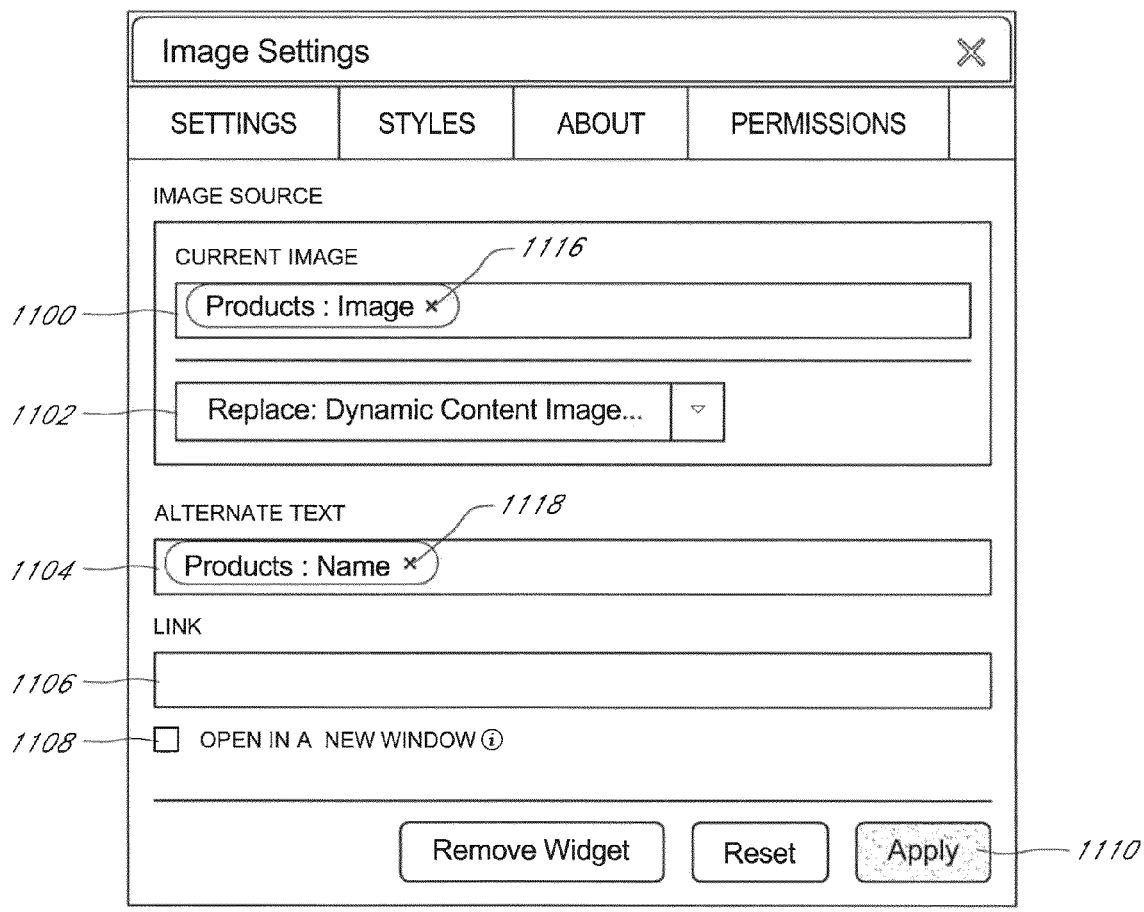
FIG. 11C shows a screenshot of an example embodiment of the user interface for configuring an Image module, including attributes of a content set.

Referring to FIG. 12B, in this example, to build the page layout, the user starts by dragging an Image module 1208 from the toolbar 1200 onto the page layout area 1202. Referring to FIG. 12C, the inserted and un-configured module 1212 is shown. The user then configures the settings of the module 1212, so that it accepts the image attribute from the Products content set the user created earlier. An example process for configuring the module may utilize the user interface as shown in FIG. 11A-C.

Referring to FIG. 11A, the user selects the Current Image field 1100 (e.g., by moving a cursor to, or pointing at the Current Image field 1100). Referring FIG. 11B, the CMS presents the user with an attribute menu 1112 containing some or all attributes of some of all content sets. In this embodiment, the user can cause the CMS to present the attribute menu 1112 by pressing a key (e.g., the down-arrow key), but other techniques for bringing up the menu may also be used. In this example, the user selects the Products: image attribute 1114 (i.e., the image attribute of the Products content set). FIG. 11C shows the Products: Image attribute 1116 entered in the Current Image field 1100. The example Image module has other fields and options (1104-1108), and in the Alternate Text field 1104, the user has selected and instructed the CMS to add the Products:name attribute 1118 as similarly discussed above with respect to the addition of the image attribute 1114. The fully configured example Image module 1206 is shown in FIG. 12D.

The user may add and configure other modules in the same or other manner to use the other attributes of the Products content set. Because each module is not dependent on a particular data feed, the CMS is able to use a similar UI for each module.

Figure 12E:
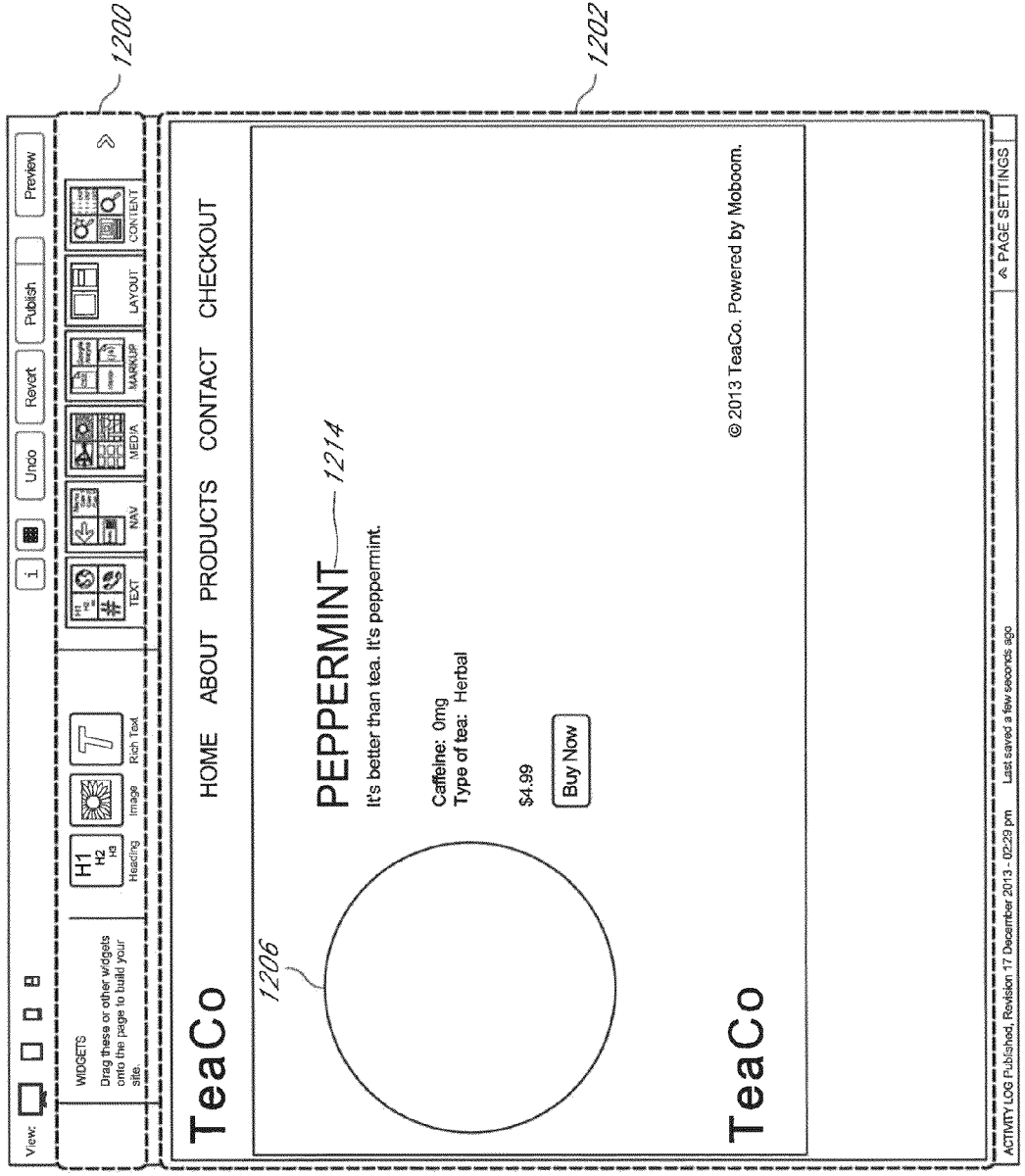
FIG. 12E shows a screenshot of an example embodiment of the user interface for configuring a page layout with several configured modules.

The fully configured example page layout is shown in FIG. 12E. This layout combines several modules. For example, the image of a tea bag 1206 is provided via the Image module described earlier (with reference to FIGS. 11A-C), and the "PEPPERMINT" heading 1214 is provided via a Heading module that is using the Products: name attribute.

Generate a Page

Once the user publishes the page layout, the CMS is configured to generate a webpage for each item in the Products content set. To view a webpage for a particular item, a visitor directs his/her browser to the URL of the page layout (e.g., http://example.com/product-details), including the unique identifier for the particular item (e.g., id=1). For example, if the URL of the page layout that the user created earlier (as shown in FIG. 12E) is http://example.com/product-details, then to view a webpage for the Earl Grey item of the Products content set, a user would visit: http://example.com/product-details?id=1. The Earl Grey item has a unique identifier of 1 because that is the id that is defined in the original data feed (as shown in the Program Listing).

Figure 12F:
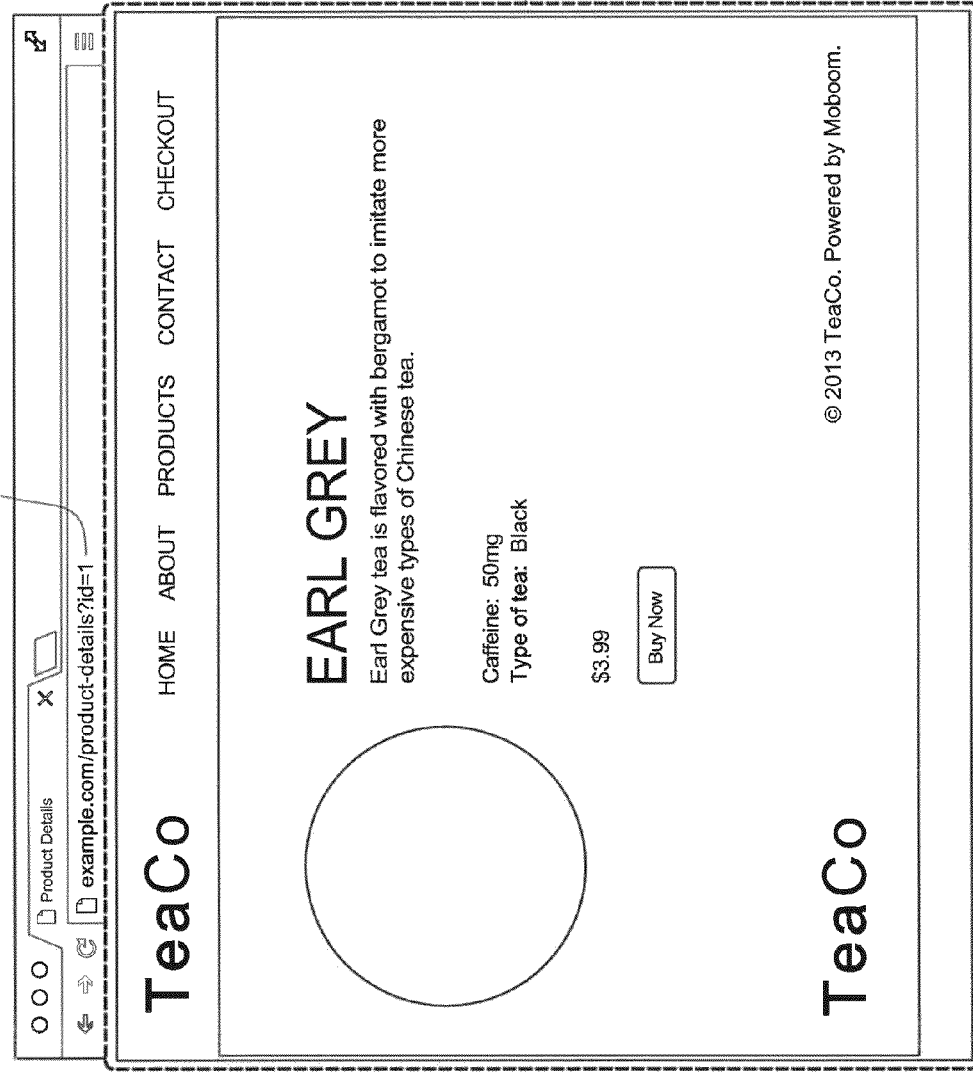
FIG. 12F shows a screenshot of an example embodiment of a generated webpage displayed in a web browser.

FIG. 12F shows the example Earl Grey webpage when viewed in a browser. The URL 1216 indicates that the browser requested the item with an id equal to 1. As described earlier (and as shown in FIG. 6), the request 600 is transmitted to the renderer 610, which passes the request to the page layout 612. The page layout passes the request to the individual modules, which each call for attributes of a particular content set.

As noted, in the example shown in FIG. 12A-E, the modules are configured to use attributes of the Products content set. The id requested is 1, which corresponds to the Earl Grey item. Therefore, the modules (as shown in FIG. 5) use content from the attributes of the Earl Grey item and the generated webpage 624 is for Earl Grey tea 1218.

Additional Example Embodiments

Detect the File Format

While content of any schema can be imported into the adaptive content management system (CMS), the CMS is optionally configured to determine how to decode and read the format of imported content. The format refers to the manner in which the data feed was encoded and the markup language used to create the data feed. Examples of possible file formats include but are not limited to Extensible Markup Language (XML), character-separated values (CSV), JavaScript Object Notation (JSON), and Excel Binary File Format (XLS). Understanding the semantics of the encoding method and markup language of imported content enables the CMS to properly map that content.

Figure 8A:
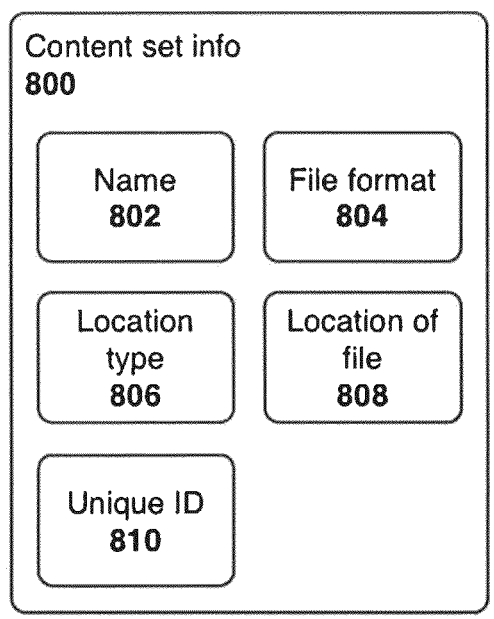
FIG. 8A illustrates example information that enables a CMS to import and map a data feed.

Various techniques may be used to communicate the file format to the CMS. In an example embodiment, the CMS can specifically request this information (e.g., from the content source or the user) when importing a data feed. This embodiment is shown in FIG. 8A, where the content set information included file format 804. The CMS can then receive and utilize the file format information.

Optionally, the CMS is configured to detect the file format of a data feed automatically. For example, information about the file format might be embedded in the metadata of a data feed which may be read by the CMS. The extension of a data feed may also indicate its format, and so the CMS may determine the format based on the extension. Optionally, the CMS can compare patterns in the data encoding against a database of known patterns to determine the encoding method. Certain embodiments may use any combination of the foregoing techniques to determine the format.

Data Feed Details

In one or more embodiments, certain details about an imported data feed may be passed to the CMS, as will be discussed with reference to the examples illustrated in FIGS. 8A-D. Many variations and modifications to the requested details are possible, and the details described here and illustrated in FIGS. 8A-D are to be understood as being among other acceptable examples. The content set information 800 represents information about the data feed that the CMS requests before beginning the import process 100. This information enables a user to control how the feed is mapped.

As shown in FIG. 8A, in this example, the content set information includes the following details (it being understood that other example may include different details):

Name 802 (e.g., a unique name that identifies the content set)

File format 804 (e.g., the manner in which the data feed was encoded and the markup language used to create the data feed)

Location type 806 (e.g., webpage, FTP, or local directory)

Location of file 808 (e.g., the URL or directory where the file is stored)

Unique ID 810 (e.g., the name of the unique identifier field in the data feed)

Figure 8B:
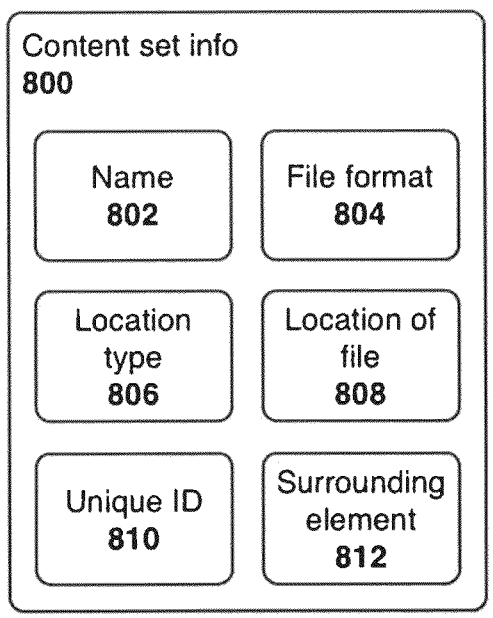
FIG. 8B illustrates example information that may be pertinent for XML data feeds.

Another example embodiment of content set information is shown in FIG. 8B. If the file format of the data feed is an XML file, then requesting and receiving the name of the root element that surrounds each item 812 enables the CMS to more accurately map the data feed.

Figure 8C:
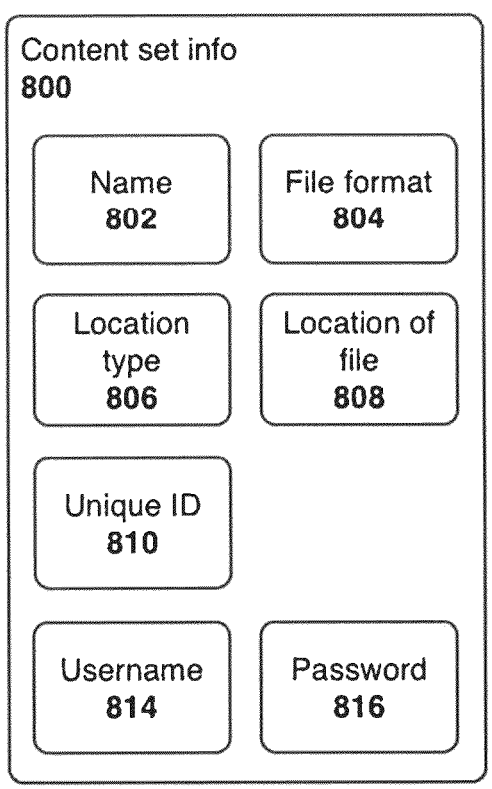
FIG. 8C illustrates example information that may be pertinent for password-protected files.

The example embodiment of content set information illustrated in FIG. 8C includes two optional fields: username 814 and password 816. This embodiment handles the case of password-protected data feeds.

Figure 8D:
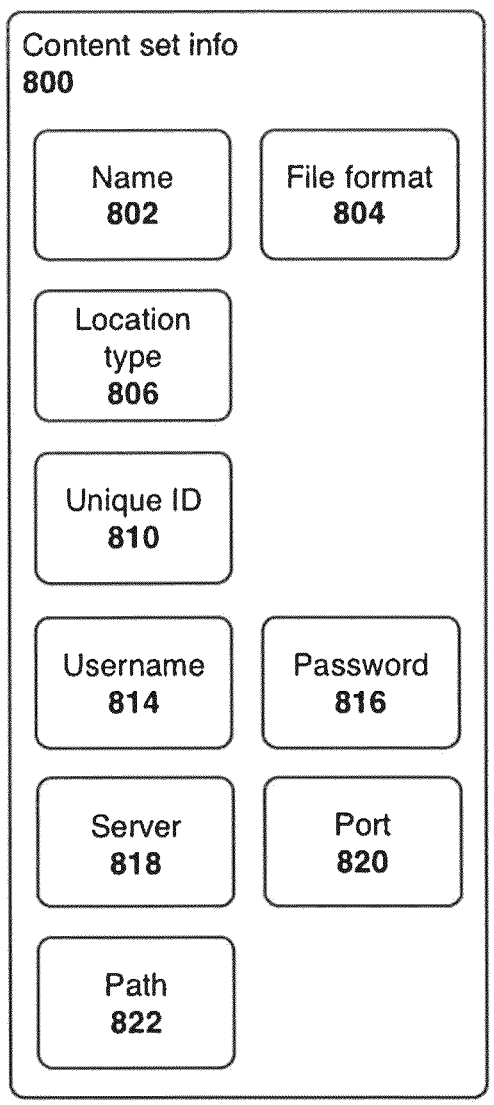
FIG. 8D illustrates example information that may be pertinent for files stored on an FTP.

The embodiment of content set information shown in FIG. 8D includes additional fields to handle the case of a file stored on an FTP server. Additional pertinent information includes:

Server 818 (the location of the sever that stores the data feed)

Port 820 (the number of the port that should be used to open a data connection)

Path 822 (the location where the file is stored on the server)

Synchronization and Auto-Synchronization

As illustrated in FIG. 1, once a feed is imported into the CMS 100, at block 106, the feed may be synchronized. In an example embodiment, as part of the synchronization process, the CMS will reimport the feed using any feed details that have already been entered. There are various reasons for synchronizing an already imported feed, but one optional reason is to ensure that the imported content matches the current content in the data feed.

Optionally, the process of synchronizing content involves synchronizing in response to a manual instruction. For example, a user accessible synchronization control may be provided. If a user wants to synchronize content, then the user may select the synchronization control, and in response to detecting the selection of the synchronization control, the CMS imports and maps the latest content from the data feed. Optionally in addition or instead, a user may specify a synchronization schedule which may be received and stored by the CMS. The CMS may then perform the content synchronization according to the schedule. For example, synchronization could be set to occur at a designated start time and/or at designated intervals (e.g., once a minute, once an hour, or every Tuesday at 5:00 PM).

By enabling users to synchronize an imported feed, users are enabled to manage content residing outside of the adaptive CMS. For example, a user can manage photos through an image-management service and then use an adaptive CMS to display the photos on a separate portfolio website by regularly synchronizing the CMS with a feed from the image-management service. By way of further example, a user could upload a new photo to the image-management service, and the adaptive CMS may generate a new webpage based on the new photo the next time the CMS is synchronized with the feed.

Multiple Content Sets on One Page

The example page rendering process illustrated in FIG. 6 may be utilized to render one or multiple content sets on a page. As illustrated, a page layout 612 displays different content depending on the ID in a request, such as in request 602 (ID=triangle). In this example, only one content set per page layout is used. Optionally, multiple content sets per page may be used. An example process enabling multiple content sets per page to be used comprises having a given page include arrays of content set and ID pairs, but other techniques may also be used.

Friendly URLs

While an example URL for a webpage might look like http://example.com/product-details?id=1, a webpage may optionally be generated using a friendly URL (a Web address that is easy to read and includes words that describe the content of the webpage). An example of a friendly URL is: http://example.com/product-details/earl-grey. One suitable embodiment of this process involves mapping a friendly name (e.g., earl-grey) to the unique ID (e.g., 1), for example, using a data structure such as an associative array.

Manual Mapping

Auto-mapping of content, as described above with reference to FIG. 1, might not be without error. To address such an eventuality, an example embodiment, such as that illustrated in FIG. 9, enables manual verification and control of the mapping process. With each content set 900, the attribute type 904 for each attribute 902 can be selected by the user and the selected is received and stored by the CMS for later use in the mapping process. Optionally, a menu 907 containing possible attribute types 908-926 (string 908, float 910, double 912, byte 914, short 916, integer 918, long 920, date 922, Boolean 924, binary 926) can be provided by the CMS to aid the user in selecting an appropriate attribute type, but other attribute types may also be used.

Figure 9:
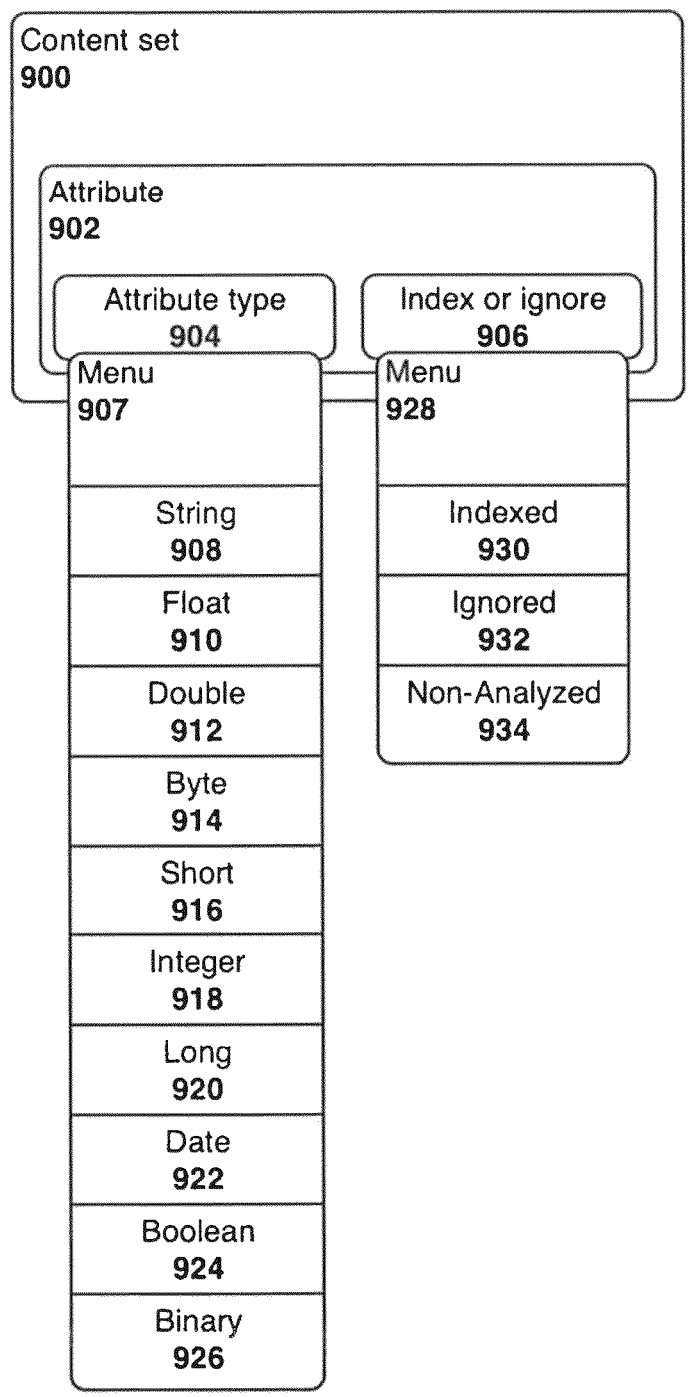
FIG. 9 shows an example embodiment that enables manual verification and control over the mapping process.

In the example embodiment shown in FIG. 9, the user may manually specify how the attribute is stored via menu interface 906 (e.g., which enables the user to specify whether the attribute is to be indexed, ignored, or not analyzed). For example, if a data feed contains an unnecessary attribute, then a user might choose to instruct the CMS to ignore the attribute by selecting the ignored menu selection 932. Optionally instead, a user can instruct the CMS to index the attribute by selecting the index menu selection 930, to make it discoverable by other widgets, or a user could set the attribute to non-analyzed by selecting the non-analyzed menu selection 934 to force the attribute to be treated as a whole by the CMS and prevent it from being broken down through further processing.

Multi-Tenant Development

In an example embodiment, if each module is properly encapsulated to accept content in only high-level terms (e.g., text, image, or URL) and to execute independently of other modules, then one or more modules can be incorporated within another module (e.g., without requiring an open source environment which user are provided with the ability to modify the source code).

For example, suppose developer A wants to create a module that displays a heading, followed by an image, followed by text. If each module is properly encapsulated as described earlier, instead of hand coding the entire module, A could just incorporate a premade heading, image, and text module. If developer B, wants to expand on A's module by adding a video, then B could just incorporate A's module with a premade video module.

This type of customization conventionally requires sharing source code, but with proper encapsulation and a content agnostic approach as described herein, multi-tenant modules of this type may be performed without sharing any source code.

Generated Output

While the example CMS optionally eventually generates a webpage, the CMS may be configured to generate other types of data in any form, such as, by way of example, XML, JSON, or CSV data feeds. The ability to transform the data and the method by which the data are transformed are not dependent on the eventual output.

Involving Additional Systems

While a single CMS may optionally be used to execute the process for transforming a data feed into a website, optionally different systems may be utilized at different stages. In an example embodiment, one system may be used to import the content, another separate system may be used to configure the page layout, and a third system may be used to dynamically generate the content. The use of multiple systems may provide the same or similar ability to transform the data feed using the same or similar processes as the single system embodiment.

The methods and processes described herein may have fewer or additional steps or states and the steps or states may be performed in a different order. Not all steps or states need to be reached. The methods and processes described herein may be embodied in, and fully or partially automated via, software code modules executed by one or more general or special purpose computers comprising one or more hardware computing devices. The code modules may be stored in any type of non-transitory computer-readable medium or other computer storage device. Some or all of the methods may alternatively be embodied in whole or in part in specialized computer or state machine hardware. The results of the disclosed methods may be stored in any type of computer data repository, such as relational databases and flat file systems that use volatile and/or non-volatile memory (e.g., magnetic disk storage, optical storage, EEPROM and/or solid state RAM). The servers discussed herein may include (or be hosted on systems that include) network interfaces configured to receive document requests (e.g., webpage requests from a browser) and to transmit responses to the requester. The servers and other devices described herein may optionally include displays and user input devices (e.g., keyboards, touch screens, mice, voice recognition, gesture recognition, etc.).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. The use of particular terminology when describing certain features or aspects of certain embodiments should not be taken to imply that the terminology is being re-defined herein to be restricted to including any specific characteristics of the features or aspects of the invention with which that terminology is associated.

Optional Advantages

From the previous description, a number of optional advantages of some embodiments of adaptive content management become evident. A given embodiment may provide one or more of the following advantages:

A user can import content without having to consider if its schema is compatible with the content management system (CMS); therefore, a user does not have to search for particular feed-compatible widget/module before using a feed.

Plugins are optionally not designed for or limited to specific feeds, and so users are more likely to find modules with the behavior that they desire. For example, if one developer builds a module that displays an image slideshow, then that slideshow module will work with any imported image feed. With the conventional approach described earlier, a developer would have to design that same slideshow module for each different image feed that has a different schema.

A module developer can incorporate other modules into a custom module, because modules are optionally completely encapsulated to accept high-level input and to generate output. This feature enables the type of sharing available in an open-source environment, but unlike in an open-source environment, developers are able to conceal source code. So if a first module performs some but not all functions that a user wants, then another developer can just add functionality without redesigning the first module from scratch and without having access to the source code of the first module.

The CMS optionally handles all content management, and the CMS handles the administration UI for the modules. Modules are therefore likely to remain compatible as new versions of the CMS are released.

Users can migrate content from an old CMS to a new adaptive CMS by exporting their old content as a feed, and then by giving the location of that feed to the adaptive CMS. With the conventional approach, migrating from an old CMS requires a custom plugin.

If a user likes the way the old CMS manages content, but prefers the way the new adaptive CMS displays the content, then the user can continue to manage that content via the old CMS. The user would just set the adaptive CMS to regularly sync with a feed from that old CMS. As described earlier, with the conventional approach, this scenario requires custom software development.

Because modules are not designed to work with only one feed or with only one schema in particular, a user can change the contents of an entire website by first importing a new feed and then assigning the attributes of that feed to the already created page layouts. Users do not have to find or develop new modules to work with the new feed.

In the case of the three example data feeds shown in the Program Listing section, a user could change the import details on a content set from referencing one feed (e.g., the JSON feed) to referencing another feed (e.g., the CSV feed). Although both feeds are in different markup languages and might be stored at different locations, both feeds have the same relationship between information. Therefore, page layouts and modules will interact with any of the three data feeds identically, and the previous configuration would still be accurate.

Conclusion

Thus, as described herein, using the example adaptive content management system and process, scenarios that once required a high level of technical knowledge (e.g., combining several different feeds from several different locations into one coherent website) now no longer require that a user understand even a single markup or programming language. Indeed, a user with a high level of technical knowledge can save a significant amount of time and effort by using an adaptive content management system (CMS).

Furthermore, certain embodiments of the adaptive CMS have additional optional advantages, including one or more of the following:

Because an adaptive CMS adapts to the relationship of content stored within a data feed, optionally all content is treated equally regardless of its data structure or format.

Users can pull and use data from a variety of feeds without having to install or build custom plugins.

Migrating from one CMS to another is a common scenario, however many conventional systems will support migration in only specific instances. By creating an environment that is agnostic to the structure of content, an adaptive CMS is able to import content from any CMS that can export content as a data feed.

By not committing to one particular content structure, an adaptive CMS lets a user manage content in multiple content management systems and then synchronize the content in order to output one website. For example, the user may merely need to copy and paste a URL to the content and cause the synchronization to be initiated; the user does not need to develop custom software or even install custom plugins in order to synchronize the content.

By not depending on content to have a particular structure, an example adaptive CMS can completely change the content on a site by synchronizing with a different feed and then assigning the attributes of that feed to the already present page layouts.

Program Listing

The following section provide several non-limiting examples. The example XML, JSON, and CSV data feeds all contain the same information, but they are structured using three different markup languages. These three examples are not meant to be all inclusive of possible types of data feeds; for example, data feeds might be in any schema, and data feeds might even be encoded in machine-readable formats such as Excel Binary File Format (XLS).

Example XML Feed

```
<?xml version="1.0" encoding="UTF-8"?>
<teas>
    <tea>
        <id>3</id>
        <name>Peppermint</name>
        <caffeine>0</caffeine>
        <type>Herbal</type>
        <description>It's better than tea. It's peppermint.</description>
        <price>4.99</price>
<image>http://example.com/feeds/imgs/tea_bag_peppermint.png</image>
<thumb>http://example.com/feeds/imgs/tea_bag_peppermint_small.png</thumb>
    </tea>
    <tea>
        <id>2</id>
        <name>Ginger Mint</name>
        <caffeine>0</caffeine>
        <type>Herbal</type>
        <description>Some days you get the ginger mint, and some days the ginger mint gets you.</description>
        <price>5.99</price>
<image>http://example.com/feeds/imgs/tea_bag_ginger_mint.png</image>
<thumb>http://example.com/feeds/imgs/tea_bag_ginger_mint_small.png</thumb>
    </tea>
    <tea>
        <id>1</id>
        <name>Earl Grey</name>
        <caffeine>50</caffeine>
        <type>Black</type>
        <description>Earl Grey tea is flavored with bergamot to imitate more expensive types of Chinese tea.</description>
        <price>3.99</price>
<image>http://example.com/feeds/imgs/tea_bag_earl_grey.png</image>
<thumb>http://example.com/feeds/imgs/tea_bag_earl_grey_small.png</thumb>
    </tea>
</teas>
```

Example JSON Feed

```
[
    {
        "id": "3",
        "name": "Peppermint",
        "caffeine": "0",
        "type": "Herbal",
        "description": "It's better than tea. It's peppermint.",
        "price": "4.99",
        "image": "http://example.com/feeds/imgs/tea_bag_peppermint.png",
        "thumb": "http://example.com/feeds/imgs/tea_bag_peppermint_small.png"
    },
    {
        "id": "2",
        "name": "Ginger Mint",
        "caffeine": "0",
        "type": "Herbal",
        "description": "Some days you get the ginger mint, and some days the ginger mint gets you.",
        "price": "5.99",
        "image": "http://example.com/feeds/imgs/tea_bag_ginger_mint.png",
        "thumb": "http://example.com/feeds/imgs/tea_bag_ginger_mint_small.png"
    },
    {
        "id": "1",
        "name": "Earl Grey",
        "caffeine": "50",
        "type": "Black",
        "description": "Earl Grey tea is flavored with bergamot to imitate more expensive types of Chinese tea.",
        "price": "3.99",
        "image": "http://example.com/feeds/imgs/tea_bag_earl_grey.png",
        "thumb": "http://example.com/feeds/imgs/tea_bag_earl_grey_small.png"
    }
]
```

Example CSV Feed

```
id,name,caffeine,type,description,price,image,thumb
"3","Peppermint","0","Herbal","It's better than tea. It's peppermint.","4.99","http://example.com/feeds/imgs/tea_bag_peppermint.png","http://example.com/feeds/imgs/tea_bag_peppermint_small.png"
"2","Ginger Mint","0","Herbal","Some days you get the ginger mint, and some days the ginger mint gets you.","5.99","http://example.com/feeds/imgs/tea_bag_ginger_mint.png","http://example.com/feeds/imgs/tea_bag_ginger_mint_small.png"
"1","Earl Grey","50","Black","Earl Grey tea is flavored with bergamot to imitate more expensive types of Chinese tea.","3.99","http://example.com/feeds/imgs/tea_bag_earl_grey.png","http://example.com/feeds/imgs/tea_bag_earl_grey_small.png"
```

Example Associative Array Relationship

The following example demonstrates the relationship of data in a feed stored using an associative array, but other methods of storing the data may also be used.

```
array(3) {
    [1]=>
    array(8) {
        ["id"]=>
        string(1) "1"
        ["name"]=>
        string(9) "Earl Grey"
        ["caffeine"]=>
        string(2) "50"
        ["type"]=>
        string(5) "Black"
        ["description"]=>
        string(87) "Earl Grey tea is flavored with bergamot to imitate more expensive types of Chinese tea."
        ["price"]=>
        string(4) "3.99"
        ["image"]=>
        string(51)
        "http://example.com/feeds/imgs/tea_bag_earl_grey.png"
        ["thumb"]=>
        string(57)
"http://example.com/feeds/imgs/tea_bag_earl_grey_small.png"
    }
    [2]=>
    array(8) {
        ["id"]=>
        string(1) "2"
        ["name"]=>
        string(11) "Ginger Mint"
        ["caffeine"]=>
        string(1) "0"
        ["type"]=>
        string(6) "Herbal"
        ["description"]=>
        string(74) "Some days you get the ginger mint, and some days the ginger mint gets you."
        ["price"]=>
        string(4) "5.99"
        ["image"]=>
        string(53)
        "http://example.com/feeds/imgs/tea_bag_ginger_mint.png"
        ["thumb"]=>
        string(59)
"http://example.com/feeds/imgs/tea_bag_ginger_mint_small.png"
    }
    [3]=>
    array(8) {
        ["id"]=>
        string(1) "3"
        ["name"]=>
        string(10) "Peppermint"
        ["caffeine"]=>
        string(1) "0"
        ["type"]=>
        string(6) "Herbal"
        ["description"]=>
        string(38) "It's better than tea. It's peppermint."
        ["price"]=>
        string(4) "4.99"
        ["image"]=>
        string(52)
        "http://example.com/feeds/imgs/tea_bag_peppermint.png"
        ["thumb"]=>
        string(58)
"http://example.com/feeds/imgs/tea_bag_peppermint_small.png"
    }
```

The methods and processes described herein may have fewer or additional steps or states and the steps or states may be performed in a different order. Not all steps or states need to be reached. The methods and processes described herein may be embodied in, and fully or partially automated via, software code modules executed by one or more general or special purpose computers comprising one or more hardware computing devices. The code modules may be stored in any type of non-transitory computer-readable medium or other computer storage device. Some or all of the methods may alternatively be embodied in whole or in part in specialized computer or state machine hardware. The results of the disclosed methods may be stored in any type of computer data repository, such as relational databases and flat file systems that use volatile and/or non-volatile memory (e.g., magnetic disk storage, optical storage, EEPROM and/or solid state RAM). The servers discussed herein may include (or be hosted on systems that include) network interfaces configured to receive document requests (e.g., webpage requests from a browser) and to transmit responses to the requester. The servers and other devices described herein may optionally include displays and user input devices (e.g., keyboards, touch screens, mice, voice recognition, gesture recognition, etc.).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. The use of particular terminology when describing certain features or aspects of certain embodiments should not be taken to imply that the terminology is being re-defined herein to be restricted to including any specific characteristics of the features or aspects of the invention with which that terminology is associated.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The results of the disclosed methods may be stored in any type of computer data repository, such as relational databases and flat file systems that use magnetic disk storage and/or solid state RAM.

While the phrase "click" may be used with respect to a user selecting a control or the like, other user inputs may be used, such as voice commands, text entry, gestures, etc.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computer-implemented method of configuring a web page layout, the method comprising:
    providing a user access to a library of modules usable to configure a layout of a webpage, wherein a given module from the library of modules is user configurable, without the user programming in a programming language, to control how content is to be displayed on a webpage;

enabling the user to drag and drop one or more modules from the library of modules onto a webpage layout design area to define a webpage layout, wherein the library comprises an image slide module that can be dragged and dropped onto the webpage layout design area to define the webpage layout, the image slide module configurable the user for use with a plurality of different image sources having different data formats;

providing, for a given module selected by the user, a module configuration user interface, wherein the module configuration user interface comprises a plurality of fields that enables the user to specify what content is to be displayed on the webpage being designed and how the content is to be displayed without the user having to program using a programming language, wherein the module configuration user interface comprises interfaces configured to receive at least:

access information for content from a source, the access information including at least a content locator;

content attributes comprising at least one attribute affecting how content from the source is displayed;

receiving and storing a module configuration for a first instantiation of a first module specified by the user via the module configuration user interface, including at least access information and at least one attribute for a first content source that provides content using a first content format;

receiving and storing a module configuration for a second instantiation of the first module specified by the user via the module configuration user interface, including at least access information and at least one attribute for a second content source that provides content using a second content format, the second content format different than the first content format;

receiving a user specified layout for a first webpage specified by the user via the webpage layout design area, wherein the user specified layout for the first webpage comprises a layout of a plurality of modules, including:

the first instantiation of the first module configured by the user to specify access information and at least one attribute for a first content source that provides content using a first content format;

the second instantiation of the first module configured by the user to specify access information and at least one attribute for a second content source that provides content using a second content format, the second content format different than the first content format;

accessing content from the first content source based at least in part on the user configuration of the first instantiation of the first module, including at least a portion of the user specified access information for the first source, wherein the content from the first content source utilizes the first content format;

storing content from the first content source in a schema-less data store;

accessing content from the second content source based at least in part on the user configuration of the second instantiation of the first module, including at least a portion of the user specified access information for the second source, wherein the content from the second content source utilizes the second content format;

storing content from the second content source in the schema-less data store; and enabling the webpage to be rendered, including the content from the first content source and the content from the second content source.

2. The method as defined in claim 1, wherein the library of modules comprises, a blog module, a news feed module, a sports score module, a video playlist module, a responsive menu module, a shopping cart module, a map module, a search module, a text module, a navigation module, an accordion menu module, a share page or content module, and a social media module, wherein a module configuration user interface for each of the foregoing modules enables the user to specify a content name, a content file format, and a document element, that are user configurable to control how content is to be displayed on a webpage, without the user programming in a programming language, the method further comprising:

verifying at least a first content locator for the first content source for the first instantiation of the first module;

at least partly in response to determining that the verification of the first content locator for the first content source for the first instantiation of the first module failed, generating a user notification indicating that the verification of the first content locator for the first content source for the first instantiation of the first module failed without rendering content from the first content source and providing a prompt to enter a correct content locator for the first content source;

verifying at least a portion of the user specified access information for the second content source; and enabling the content from the second content source to be rendered after determining that the verification of user specified access information for the second content succeeded.

3. The method as defined in claim 1, the method further comprising performing data mapping on the content from the first content source.

4. The method as defined in claim 1, the method further comprising:

verifying at least a portion of the user specified access information for the first content source;

at least partly in response to determining that the verification of user specified access information for the first content source failed, generating a user notification indicating that the verification of the user specified access information for the first content source failed without rendering content from the first content source;

verifying at least a portion of the user specified access information for the second content source;

enabling the content from the second content source to be rendered after determining that the verification of user specified access information for the second content succeeded.

5. The method as defined in claim 1, the method further comprising:

accessing content from the first content source using the user specified access information for the first content source;

determining if content from the first content source is malformed;

at least partly in response to determining that the content from the first content source is malformed, attempting to correct the malformed content from the first content source.

6. The method as defined in claim 1, the method further comprising:

detecting the first format of the first content source;

detecting the second format of the first content source.

7. The method as defined in claim 1, wherein the schema-less data store comprises key-value data.

8. The method as defined in claim 1, wherein the schema-less data store comprises an associative array.

9. The method as defined in claim 1, wherein the schema-less data store comprises content having tagged elements.

10. The method as defined in claim 1, wherein the user specified access information for the first content source further comprises a username, a password, a port identifier, and/or a server identifier.

11. The method as defined in claim 1, wherein the module configuration user interface enables the user to specify a content name, a content file format, a document element, a user name, and a user password.

12. The method as defined in claim 1, wherein the library of modules further comprises a blog module, a news feed module, a sports score module, a video playlist module, a responsive menu module, a shopping cart module, a map module, a search module, a text module, a navigation module, an accordion menu module, a share page or content module, and a social media module.

13. A system, comprising:
a network interface configured to communicate over a network;
a computing system comprising one or more computing devices; and
a computer storage system comprising a non-transitory storage device, said computer storage system having stored thereon executable program instructions that direct the computer system to at least:
provide, over the network, a user access to a library of modules usable to configure a layout of a webpage, wherein a given module from the library of modules is user configurable, without the user programming in a programming language, to control how content is to be displayed on a webpage, wherein the library comprises an image slide module that can be dragged and dropped onto a webpage layout design area to define the webpage layout, the image slide module configurable by the user for use with a plurality of different image sources having different data formats;
enable the user to instantiate one or more modules from the library of modules onto the webpage layout design area to define a webpage layout;
provide, for a given module selected by the user, a module configuration user interface, wherein the module configuration user interface comprises a plurality of fields that enables the user to specify what content is to be displayed on the webpage being designed and how the content is to be displayed without the user having to program using a programming language, wherein the module configuration user interface comprises interfaces configured to receive at least:
access information for content from a source, the access information including at least a content locator;
content attributes comprising at least one attribute affecting how content from the source is displayed;
receive and store a module configuration for a first instantiation of a first module specified by the user via the module configuration user interface, including at least access information and at least one attribute for a first content source that provides content using a first content format;
receive and store a module configuration for a second instantiation of the first module specified by the user via the module configuration user interface, including at least access information and at least one attribute for a second content source that provides content using a second content format, the second content format different than the first content format;
receive, over the network, a user specified layout for a first webpage specified by the user via the webpage layout design area, wherein the user specified layout comprises a layout of a plurality of modules, including:
the first instantiation of the first module configured by the user to specify access information and at least one attribute for a first content source that provides content using a first content format;
the second instantiation of the first module configured by the user to specify access information and at least one attribute for a second content source that provides content using a second content format, the second content format different than the first content format;
access content from the first content source based at least in part on the user configuration of the first instantiation of the first module, including at least a portion of the user specified access information for the first source, wherein the content from the first content source utilizes the first content format;
store content from the first content source in a schema-less data store;
access content from the second content source based at least in part on the user configuration of the second instantiation of the first module, including at least a portion of the user specified access information for the second source, wherein the content from the second content source utilizes the second content format;
store content from the second content source in the schema-less data store;
enable the webpage to be rendered, including the content from the first content source and the content from the second content source.

14. The system as defined in claim 13, wherein the library of modules comprises a blog module, a news feed module, a sports score module, a video playlist module, a responsive menu module, a shopping cart module, a map module, a search module, a text module, a navigation module, an accordion menu module, a share page or content module, and a social media module, wherein a module configuration user interface for each of the foregoing modules enables the user to specify a content name, a content file format, and a document element, element, that are user configurable to control how content is to be displayed on a webpage, without the user programming in a programming language, wherein the executable program instructions are further configured to direct the computer system to:
verify at least a first content locator for the first content source for the first instantiation of the first module;
at least partly in response to determining that the verification of the first content locator for the first content source for the first instantiation of the first module failed, generate a user notification indicating that the verification of the first content locator for the first content source for the first instantiation of the first module failed without rendering content from the first content source and provide a prompt to enter a correct content locator for the first content source;
verify at least a portion of the user specified access information for the second content source; and
enable the content from the second content source to be rendered after a determination that the verification of user specified access information for the second content succeeded.

15. The system as defined in claim 13, wherein the executable program instructions are further configured to direct the computer system to perform data mapping on the content from the first content source.

16. The system as defined in claim 13, wherein the executable program instructions are further configured to direct the computer system to:
verify at least a portion of the user specified access information for the first content source;
at least partly in response to determining that the verification of user specified access information for the first content source failed, generate a user notification indicating that the verification of the user specified access information for the first content source failed without rendering content from the first content source;
verify at least a portion of the user specified access information for the second content source;
enable the content from the second content source to be rendered after determining that the verification of user specified access information for the second content succeeded.

17. The system as defined in claim 13, wherein the executable program instructions are further configured to direct the computer system to:
access content from the first content source using the user specified access information for the first content source;
determine if content from the first content source is malformed;
at least partly in response to determining that the content from the first content source is malformed, attempt to correct the malformed content from the first content source.

18. The system as defined in claim 13, wherein the schema-less data store comprises key-value data, an associative array, or content having tagged elements.

19. The system as defined in claim 13, wherein the user specified access information for the first content source further comprises a username, a password, a port identifier, and/or a server identifier.

20. The system as defined in claim 13, wherein the module configuration user interface enables the user to specify a content name, a content file format, a document element, a user name, and a user password.

21. The system as defined in claim 13, wherein the library of modules further comprises a blog module, a news feed module, a sports score module, a video playlist module, a responsive menu module, a shopping cart module, a map module, a search module, a text module, a navigation module, an accordion menu module, a share page or content module, and a social media module.

22. A computer storage system comprising a non-transitory storage device, said computer storage system having stored thereon executable program instructions that direct a computer system to at least:
provide a user access to a library of modules usable to configure a layout of a webpage, wherein a given module from the library of modules is user configurable, without the user programming in a programming language, to control how content is to be displayed on a webpage, wherein the library comprises an image slide module that can be dragged and dropped onto a webpage layout design area to define the webpage layout, the image slide module configurable by the user for use with a plurality of different image sources having different data formats;
enable the user to instantiate one or more modules from the library of modules onto a webpage layout design area to define a webpage layout;
provide, for a given module selected by the user, a module configuration user interface, wherein the module configuration user interface comprises a plurality of fields that enables the user to specify what content is to be displayed on the webpage being designed and how the content is to be displayed without the user having to program using a programming language, wherein the module configuration user interface comprises interfaces configured to receive at least:
access information for content from a source, the access information including at least a content locator;
content attributes comprising at least one attribute affecting how content from the source is displayed;
receive and store a module configuration for a first instantiation of a first module specified by the user via the module configuration user interface, including at least access information and at least one attribute for a first content source that provides content using a first content format;
receive and store a module configuration for a second instantiation of the first module specified by the user via the module configuration user interface, including at least access information and at least one attribute for a second content source that provides content using a second content format, the second content format different than the first content format;
receive a user specified layout for a first webpage specified by the user via the webpage layout design area, wherein the user specified layout comprises a layout of a plurality of modules, including:
the first instantiation of the first module configured by the user to specify access information and at least one attribute for a first content source that provides content using a first content format;
the second instantiation of the first module configured by the user to specify access information and at least one attribute for a second content source that provides content using a second content format, the second content format different than the first content format;
access content from the first content source based at least in part on the user configuration of the first instantiation of the first module, including at least a portion of the user specified access information for the first source, wherein the content from the first content source utilizes the first content format;
store content from the first content source in a schema-less data store;
access content from the second content source based at least in part on the user configuration of the second instantiation of the first module, including at least a portion of the user specified access information for the second source, wherein the content from the second content source utilizes the second content format;
store content from the second content source in the schema-less data store; and
enable the webpage to be rendered, including the content from the first content source and the content from the second content source.

23. The computer storage system as defined in claim 22, wherein the executable program instructions are further configured to direct a computer system to perform data mapping on the content from the first content source.

24. The computer storage system as defined in claim 22, wherein the library of modules comprises a blog module, a news feed module, a sports score module, a video playlist module, a responsive menu module, a shopping cart module, a map module, a search module, a text module, a navigation module, an accordion menu module, a share page or content module, and a social media module, wherein a module configuration user interface for each of the foregoing modules enables the user to specify a content name, a content file format, and a document element, element, that are user configurable to control how content is to be displayed on a webpage, without the user programming in a programming language, em wherein the executable program instructions are further configured to direct the computer system to:
- verify at least a first content locator for the first content source for the first instantiation of the first module;
- at least partly in response to determining that the verification of the first content locator for the first content source for the first instantiation of the first module failed, generate a user notification indicating that the verification of the first content locator for the first content source for the first instantiation of the first module failed without rendering content from the first content source and provide a prompt to enter a correct content locator for the first content source;
- verify at least a portion of the user specified access information for the second content source; and
- enable the content from the second content source to be rendered after a determination that the verification of user specified access information for the second content succeeded.

25. The computer storage system as defined in claim 22, wherein the executable program instructions are further configured to direct a computer system to:
- verify at least a portion of the user specified access information for the first content source;
- at least partly in response to determining that the verification of user specified access information for the first content source failed, generate a user notification indicating that the verification of the user specified access information for the first content source failed without rendering content from the first content source;
- verify at least a portion of the user specified access information for the second content source;
- enable the content from the second content source to be rendered after determining that the verification of user specified access information for the second content source succeeded.

26. The computer storage system as defined in claim 22, wherein the executable program instructions are further configured to direct a computer system to:
- access content from the first content source using the user specified access information for the first content source;
- determine if content from the first content source is malformed;
- at least partly in response to determining that the content from the first content source is malformed, attempt to correct the malformed content from the first content source.

27. The computer storage system as defined in claim 22, wherein the schema-less data store comprises key-value data, an associative array, or content having tagged elements.

28. The computer storage system as defined in claim 22, wherein the user specified access information for the first content source further comprises a username, a password, a port identifier, and/or a server identifier.

* * * * *